(12) United States Patent
Mahkonen et al.

(10) Patent No.: US 11,474,539 B2
(45) Date of Patent: Oct. 18, 2022

(54) OPTIMAL UNMANNED AERIAL VEHICLE FLIGHT ROUTE PLANNING BASED ON QUALITY-OF-SERVICE REQUIREMENTS FOR DATA, TELEMETRY, AND COMMAND AND CONTROL REQUIREMENTS IN 3GPP NETWORKS

(71) Applicant: Telefonaktiebolaget LM Ericsson (publ), Stockholm (SE)

(72) Inventors: Heikki Mahkonen, San Jose, CA (US); Ravi Manghirmalani, Fremont, CA (US); Attila Takács, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 370 days.

(21) Appl. No.: 16/604,102

(22) PCT Filed: Jul. 13, 2017

(86) PCT No.: PCT/IB2017/054252
§ 371 (c)(1),
(2) Date: Oct. 9, 2019

(87) PCT Pub. No.: WO2018/189576
PCT Pub. Date: Oct. 18, 2018

(65) Prior Publication Data
US 2021/0103294 A1 Apr. 8, 2021

Related U.S. Application Data

(60) Provisional application No. 62/485,810, filed on Apr. 14, 2017.

(51) Int. Cl.
*G05D 1/10* (2006.01)
*B64C 39/02* (2006.01)
(Continued)

(52) U.S. Cl.
CPC .......... *G05D 1/101* (2013.01); *B64C 39/024* (2013.01); *G08G 5/006* (2013.01); *G08G 5/0013* (2013.01);
(Continued)

(58) Field of Classification Search
CPC .... G05D 1/101; G05D 1/0038; B64C 39/024; G08G 5/0013; G08G 5/0034;
(Continued)

(56) References Cited

U.S. PATENT DOCUMENTS 7,813,326 B1 10/2010 Kelm et al.
9,363,690 B1 6/2016 Singh et al.
(Continued)

FOREIGN PATENT DOCUMENTS

CN 101836478 A 9/2010
CN 104053195 A 9/2014
(Continued)

OTHER PUBLICATIONS

International Search Report and Written Opinion for Application No. PCT/IB2017/054252, dated Jan. 3, 2018, 11 pages.
(Continued)

*Primary Examiner* — James J Lee
*Assistant Examiner* — Shon G Foley
(74) *Attorney, Agent, or Firm* — Nicholson De Vos Webster & Elliott LLP

(57) ABSTRACT

A method for managing an unmanned aerial vehicle (UAV) is described. The method may include receiving flight information describing a flight plan for the UAV; determining, based on the flight information, quality-of-service requirements for accomplishing the flight plan; transmitting, toward a policy and charging control system that manages a wireless network, a reservation request for reserving resources in the wireless network to achieve the quality-of-service require-
(Continued)

ments; receiving, from the policy and charging control system, a response to the reservation request; and determining a status of the flight plan based on the response from the policy and charging control system.

16 Claims, 10 Drawing Sheets

(51) Int. Cl.
  *G08G 5/00* (2006.01)
  *H04M 15/00* (2006.01)
  *H04W 28/02* (2009.01)
  *H04W 28/26* (2009.01)

(52) U.S. Cl.
  CPC ......... *G08G 5/0034* (2013.01); *G08G 5/0039* (2013.01); *G08G 5/0069* (2013.01); *H04M 15/66* (2013.01); *H04W 28/0268* (2013.01); *H04W 28/26* (2013.01)

(58) Field of Classification Search
  CPC .... G08G 5/0039; G08G 5/006; G08G 5/0069; G08G 5/0026; G08G 5/0043; H04M 15/66; H04W 28/0268; H04W 28/26; G01C 21/20
  See application file for complete search history.

(56) References Cited

U.S. PATENT DOCUMENTS

| | | | |
|---|---|---|---|
| 9,412,278 | B1 | 8/2016 | Gong et al. |
| 9,467,922 | B1 | 10/2016 | Buchmueller et al. |
| 9,537,561 | B1 | 1/2017 | Kotecha et al. |
| 9,588,516 | B1 | 3/2017 | Gurel et al. |
| 9,609,288 | B1 | 3/2017 | Richman et al. |
| 9,709,409 | B2 | 7/2017 | Dave et al. |
| 2004/0156399 | A1 | 8/2004 | Eran |
| 2007/0284474 | A1 | 12/2007 | Olson et al. |
| 2010/0062774 | A1 | 3/2010 | Motegi et al. |
| 2010/0085236 | A1 | 4/2010 | Franceschini et al. |
| 2010/0153001 | A1 | 6/2010 | Bauchot et al. |
| 2010/0254346 | A1 | 10/2010 | Jain et al. |
| 2011/0090843 | A1* | 4/2011 | Ramanujan ........... H04W 40/12 370/328 |
| 2012/0225675 | A1 | 9/2012 | Nishida et al. |
| 2013/0073120 | A1* | 3/2013 | Bailey ................. G08G 5/0013 701/2 |
| 2015/0038140 | A1 | 2/2015 | Kilpatrick et al. |
| 2015/0119043 | A1 | 4/2015 | Gopal et al. |
| 2015/0208300 | A1 | 7/2015 | McLaughlin et al. |
| 2015/0312813 | A1 | 10/2015 | Xu et al. |
| 2016/0065345 | A1 | 3/2016 | Kim et al. |
| 2016/0070265 | A1 | 3/2016 | Liu et al. |
| 2016/0125740 | A1 | 5/2016 | Pasko et al. |
| 2016/0140851 | A1 | 5/2016 | Levy et al. |
| 2016/0142944 | A1 | 5/2016 | Cao |
| 2016/0142994 | A1 | 5/2016 | Luo et al. |
| 2016/0161258 | A1 | 6/2016 | Magson et al. |
| 2016/0266579 | A1 | 9/2016 | Chen et al. |
| 2016/0284221 | A1 | 9/2016 | Hinkle et al. |
| 2016/0292403 | A1 | 10/2016 | Gong et al. |
| 2016/0300493 | A1 | 10/2016 | Ubhi et al. |
| 2016/0300495 | A1 | 10/2016 | Kantor et al. |
| 2016/0358187 | A1 | 12/2016 | Radocchia et al. |
| 2016/0363929 | A1 | 12/2016 | Clark et al. |
| 2016/0371985 | A1 | 12/2016 | Kotecha |
| 2016/0371987 | A1 | 12/2016 | Kotecha |
| 2016/0380692 | A1 | 12/2016 | Jalali et al. |
| 2017/0023939 | A1 | 1/2017 | Leonard et al. |
| 2017/0045884 | A1 | 2/2017 | Kablaoui |
| 2017/0092137 | A1 | 3/2017 | Hiebl |
| 2017/0124884 | A1 | 5/2017 | Shaw et al. |
| 2017/0142766 | A1 | 5/2017 | Kim |
| 2017/0150373 | A1 | 5/2017 | Brennan et al. |
| 2017/0168480 | A1 | 6/2017 | Wanstedt et al. |
| 2018/0047295 | A1* | 2/2018 | Ricci ..................... G01S 5/0263 |
| 2018/0086483 | A1 | 3/2018 | Priest et al. |
| 2018/0152510 | A1 | 5/2018 | Newton et al. |
| 2018/0247544 | A1 | 8/2018 | Mustafic et al. |
| 2018/0254826 | A1* | 9/2018 | Jungnickel ......... H04B 10/1149 |
| 2018/0279348 | A1 | 9/2018 | Huang et al. |
| 2018/0292844 | A1* | 10/2018 | Kosseifi .................. B60L 53/51 |
| 2019/0012923 | A1 | 1/2019 | Weisbrod et al. |
| 2019/0087576 | A1 | 3/2019 | Olson |
| 2019/0289505 | A1 | 9/2019 | Thomas et al. |
| 2019/0364492 | A1 | 11/2019 | Azizi et al. |
| 2020/0005651 | A1 | 1/2020 | Priest |
| 2020/0105149 | A1 | 4/2020 | Mahkonen et al. |
| 2020/0193844 | A1 | 6/2020 | Mahkonen et al. |

FOREIGN PATENT DOCUMENTS

| | | |
|---|---|---|
| CN | 105828345 A | 8/2016 |
| EP | 2175290 A1 | 4/2010 |
| EP | 2175290 B1 | 10/2013 |
| EP | 3029996 A1 | 6/2016 |
| EP | 3139516 A1 | 3/2017 |
| EP | 3349085 A1 | 7/2018 |
| JP | 2003-092545 A | 3/2003 |
| RU | 2595642 C1 | 8/2016 |
| RU | 2637838 C2 | 12/2017 |
| WO | 2011/100535 A1 | 8/2011 |
| WO | 2012112097 A1 | 8/2012 |
| WO | 2015/114572 A1 | 8/2015 |
| WO | 2015/179439 A1 | 11/2015 |
| WO | 2016/154949 A1 | 10/2016 |
| WO | 2016/161637 A1 | 10/2016 |
| WO | 2016/164892 A1 | 10/2016 |
| WO | 2016190793 A1 | 12/2016 |
| WO | 2017/042403 A1 | 3/2017 |
| WO | 2017/048363 A1 | 3/2017 |
| WO | 2017/149160 A1 | 9/2017 |

OTHER PUBLICATIONS

3GPP TS 23.203 V12.6.0, 3rd Generation Partnership Project, Technical Specification Group Services and System Aspects, Policy and charging control architecture, (Release 12), Sep. 2014, 220 pages.
3GPP TS 23.203 V14.2.0, 3rd Generation Partnership Project, Technical Specification Group Services and System Aspects, Policy and charging control architecture, (Release 14), Dec. 2016, 256 pages.
3GPP TS 23.271 V14.0.0, 3rd Generation Partnership Project, Technical Specification Group Services and System Aspects, Functional stage 2 description of Location Services (LCS), (Release 14), Dec. 2016, 180 pages.
3GPP TS 23.401 V14.2.0, 3rd Generation Partnership Project, Technical Specification Group Services and System Aspects, General Packet Radio Service (GPRS) enhancements for Evolved Universal Terrestrial Radio Access Network (E-UTRAN) access, (Release 14), Dec. 2016, 385 pages.
3GPP TS 36.201 V14.0.0, 3rd Generation Partnership Project, Technical Specification Group Radio Access Network, Evolved Universal Terrestrial Radio Access (E-UTRA) LTE physical layer; General description, (Release 14), Sep. 2016, 15 pages.
3GPP TS 36.300 V14.1.0, 3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2, (Release 14), Dec. 2016, 317 pages.
3GPP TS 45.002 V14.0.0, 3rd Generation Partnership Project, Technical Specification Group Radio Access Network, GSM/EDGE Multiplexing and multiple access on the radio path, (Release 14), Dec. 2016, 142 pages.
Curran et al., "Location Based Predictive Handoff Algorithm for Mobile Networks," Advances in Intelligent IT: Active Media Technology, May 2006, pp. 86-91.

(56) References Cited

OTHER PUBLICATIONS

Federal Aviation Administration, Automatic Dependent Surveillance-Broadcast (ADS-B), 2019, 2 pages.
Forsberg, Providing Air Traffic Control Services for Small Unmanned Aircraft Through LTE, https://www.diva-portal.org/smash/get/diva2:1041494/FULLTEXT01.pdf, 2016, 90 pages.
GPS World, "uAvionix demonstrates dime-sized ADS-B for high-traffic drone operations", available online at <http://gpsworld.com/uavionix-demonstrates-dime-sized-ads-b-for-high-traffic-drone-operations>, retrieved on Apr. 4, 2017, 6 pages.
Guterres et al., "ADS-B Surveillance System Performance with Small UAS at Low Altitudes", available online at <https://www.mitre.org/sites/default/files/publications/16-4497-AIAA-2017-ADS-B.pdf>, 2017, 15 pages.
Huawei et al., "Mobility enhancement for Drones", 3GPP TSG-RAN WG2 Meeting #98, R2-1704997, 3rd Generation Partnership Project (3GPP), Hangzhou, China, May 14, 2017 (May 14, 2017), XP051275500, Retrieved from the Internet: URL:http://www.3gpp.org/ftp/Meetings_3GPP_SYNC/RAN2/Docs/.
Huawei et al., "Potential enhancements for drones", 3GPP TSG-RAN WG1 Meeting #89, R1-1707016, 3rd Generation Partnership Project (3GPP), Hangzhou, China, May 14, 2017 (May 14, 2017), XP051272246, Retrieved from the Internet: URL:http://www.3gpp.org/ftp/Meetings_3GPP_SYNC/RAN1/Docs/.
IEEE Std 802.11 (Trademark)—2012, Part 11: Wireless LAN Medium Access Control (MAC) and Physical Layer (PHY) Specifications, Mar. 2012, 2793 pages.
International Preliminary Report on Patentability, PCT App. No. PCT/IB2017/053444, dated Oct. 10, 2019, 9 pages.
International Preliminary Report on Patentability, PCT App. No. PCT/IB2017/053477, dated Oct. 10, 2019, 8 pages.
International Preliminary Report on Patentability, PCT App. No. PCT/IB2017/053641, dated Oct. 10, 2019, 8 pages.
International Preliminary Report on Patentability, PCT App. No. PCT/IB2017/054160, dated Oct. 16, 2019, 21 pages.
International Preliminary Report on Patentability, PCT App. No. PCT/IB2017/054252, dated Oct. 24, 2019, 8 pages.
International Preliminary Report on Patentability, PCT App. No. PCT/IB2017/057810, dated May 9, 2019, 13 pages.
International Preliminary Report on Patentability, PCT App. No. PCT/IB2017/057859, dated Oct. 10, 2019, 15 pages.
International Preliminary Report on Patentability, PCT App. No. PCT/IB2017/057860, dated Oct. 10, 2019, 14 pages.
International Search Report and Written Opinion for Application No. PCT/IB2017/053477, dated Dec. 15, 2017, 11 pages.
International Search Report and Written Opinion for Application No. PCT/IB2017/053641, dated Nov. 22, 2017, 11 pages.
International Search Report and Written Opinion for Application No. PCT/IB2017/054160, dated Mar. 13, 2018, 16 pages.
International Search Report and Written Opinion for Application No. PCT/IB2017/057810, dated Mar. 13, 2018, 10 pages.
International Search Report and Written Opinion for Application No. PCT/IB2017/057859, dated Jun. 12, 2018, 21 pages.
International Search Report and Written Opinion for Application No. PCT/IB2017/057860, dated Jun. 12, 2018, 20 pages.
International Search Report and Written Opinion, PCT App. No. PCT/IB2017/053444, dated Dec. 21, 2017, 13 pages.
International Search Report and Written Opinion, PCT App. No. PCT/IB2017/058525, dated Jul. 30, 2018, 14 pages.
International Search Report and Written Opinion, PCT App. No. PCT/IB2018/052238, dated Dec. 13, 2018, 12 pages.
International Search Report and Written Opinion, PCT App. No. PCT/IB2018/052239, dated Nov. 29, 2018, 13 pages.
International Search Report and Written Opinion, PCT App. No. PCT/US2017/050046, dated Dec. 13, 2017, 13 pages.
Kapellaki et al., "The "Le" interface: performance evaluation of 2-tier and 3-tier 3GPP compliant realizations," IEEE International Conference on Communications, ICC 2005, vol. 3, No. 16, 2005, pp. 1423-1427.
Latas, "The Drone Safety Platform", available online at <http://www.flylatas.com/>, retrieved on Mar. 31, 2017, 7 pages.
LG Electronics Inc., "Aerial Traffic Handling using Positioning Identification", 3GPP TSG-RAN WG2 Meeting #98, 2-1705660, 3rd Generation Partnership Project (3GPP), Hangzhou, China, May 14, 2017 (May 14, 2017), KP051275974, Retrieved from the Internet: URL:http://www.3gpp.org/ftp/Meetings 3GPP SYNC/RAN2/Docs/.
MAVLINK Common Message set specifications, available online at <http://mavlink.org/messages/common>, retrieved on Jan. 31, 2017, 98 pages.
Opensignal, "Opensignal combines real-world measurements with scientific analysis to provide independent insights on mobile connectivity globally", available online at <https://www.opensignal.com/>, 2020, 4 pages.
Orefice, "ADS-B Based Sense and Avoid Applications for General Aviation/Unmanned Aircraft", available online at <http://www.fedoa.unina.it/10305/1/orefice_martina_27.pdf>, 2015, 114 pages.
Qualcomm, LTE Unmanned Aircraft Systems, Qualcomm Technologies, Inc., Trial Report, v1.0.1, May 12, 2017, 65 pages.
R1-1705823, 3GPP TSG-RAN WG1 Meeting 88bis, Spokane, KDDI Corporation, Field measurement results for drone LTE enhancement, USA, Apr. 3-7, 2017, 6 pages.
Radio Control, Beginners' Guide, available online at <https://rcplanes.online/guide1.htm>, May 8, 2019, 9 pages.
Ruano et al., "Augmented Reality Tool for the Situational Awareness Improvement of UAV Operators", Sensors, vol. 17, 2017, 16 pages.
Second Written Opinion for Application No. PCT/IB2017/054160, dated Jun. 7, 2019, 15 pages.
SUR.ET1.ST05.2000-STD-12-01, Eurocontrol Standard Document for Surveillance Data Exchange, Part 12: Category 021, ADS-B Reports, Dec. 2010, 72 pages.
UAS Identification and Tracking (UAS ID) Aviation Rulemaking Committee (ARC), ARC Recommendations Final Report, Sep. 30, 2017, 213 pages.
UAvionix, "ADS-B Transceivers, Receivers and Navigation Systems for Drones", available online at <http://www.unmannedsystemstechnology.com/company/uavionix-corporation>, retrieved on Apr. 4, 2017, 10 pages.
Unmanned Aircraft System (UAS) Traffic Management (UTM), available online at <https://utm.arc.nasa.gov/index.shtml>, retrieved on Apr. 4, 2017, 2 pages.
Wikipedia, "Blockchain", available online at <https://en.wikipedia.org/w/index.php?title=Blockchain&oldid=901056350>, retrieved on Jun. 9, 2019, 20 pages.
Wikipedia, "Global Positioning System", available online at <https://en.wikipedia.org/w/index.php?title=Global_Positioning_System&oldid=917890871>, Sep. 26, 2019, 36 pages.
Office Action, TW App No. 107115169, dated Apr. 22, 2019, 9 pages (2 pages of Partial English Translation and 7 pages of Original Document).
Office Action, TW App. No. 107115169, dated Nov. 28, 2018, 17 pages (8 pages of English Translation and 9 pages of Original Document).

* cited by examiner

OPTIMAL UNMANNED AERIAL VEHICLE FLIGHT ROUTE PLANNING BASED ON QUALITY-OF-SERVICE REQUIREMENTS FOR DATA, TELEMETRY, AND COMMAND AND CONTROL REQUIREMENTS IN 3GPP NETWORKS

CROSS-REFERENCE TO RELATED APPLICATIONS

This application is a national stage of International Application No. PCT/IB2017/054252, filed Jul. 13, 2017, which claims the benefit of U.S. Provisional Application No. 62/485,810, filed Apr. 14, 2017, which are hereby incorporated by reference.

FIELD

Embodiments of the invention relate to the field of managing Unmanned Aerial Vehicles (UAVs); and more specifically, to planning UAV flight plans/routes based on network quality-of-service requirements.

BACKGROUND

The Federal Aviation Administration (FAA) and National Aeronautics and Space Administration (NASA) are defining an Unmanned Aerial Vehicle (UAV) Traffic Management (UTM) framework/system. Such a system seeks to present an effective management structure for UAV traffic. In this vein, the UTM is sought to act as an enabler to promote widespread use of UAVs in both commercial and recreational settings while at the same time minimizing the perils to manned air traffic and surrounding pieces of infrastructure. The UTM system is designed to work autonomously, with no active human air traffic controller constantly supervising and monitoring the airspace.

Besides enforcing the constraints and directives from the FAA and other regulatory/governmental agencies, the UTM can provide supplemental data services to UAV operators. Such services could include terrain information, weather information, communication coverage, spatial occupancy of other UAVs, surveillance information of a mission area, or performance information of specific aircraft. The UTM also allows private and public entities to provide constraints, notifications, and other necessary information to carry out UAV missions in a safe manner. A UAV Service Supplier (USS) in the UTM architecture is the entity that collects all required information from other entities or connects information consumers with their providers upon request.

A UTM system will commonly be used for planning, scheduling, and executing a UAV mission. When a UAV operator is planning for a UAV mission (e.g., a package delivery mission), the UAV operator will post the planned mission request to the USS. The USS will check that the planned mission is allowed by a Flight Information Management System (FIMS) and if permitted and with no scheduling conflicts, the UAV operator will eventually be granted a "go ahead" to carry out the mission. At this stage, the USS could send all relevant information, including the flight path, to the UAV operator. Once the mission is in progress, the USS can issue fresh notifications to the UAV operator if any mission conditions change during the allocated time slot of the mission (e.g., fresh new constraints are issued, weather emergencies arise, or the airspace becomes congested).

However, in the above described UTM system, there is no way of estimating data or control link quality for an UAV along a flight path. The end-to-end link quality will depend on the bandwidth, delay, and jitter provided or experienced by the network(s) between the UAV and the UAV operator or applications at a given time, depending on the current load conditions of the network.

SUMMARY

A method for managing an unmanned aerial vehicle (UAV) according to one embodiment is described. The method may include receiving flight information describing a flight plan for the UAV; determining, based on the flight information, quality-of-service requirements for accomplishing the flight plan; transmitting, toward a policy and charging control system that manages a wireless network, a reservation request for reserving resources in the wireless network to achieve the quality-of-service requirements; receiving, from the policy and charging control system, a response to the reservation request; and determining a status of the flight plan based on the response from the policy and charging control system.

A method for reserving resources for a UAV according to one embodiment is described. The method may include receiving, by a policy and charging rules function, a reservation request for achieving quality-of-service requirements for the UAV during a flight plan of the UAV; determining network resources in a wireless network to fulfill the quality-of-service requirements; determining availability of the network resources for the flight plan of the UAV; and transmitting a response to the reservation request that indicates the availability of the network resources for the flight plan of the UAV.

The methods/systems described herein enable UAV Traffic Management (UTM) systems to provide a supplemental data service for the UAV and the UAV operator that can estimate and reserve data, telemetry, and control link/channel resources based on the requirements and mission/flight plan to be executed. This supplemental data service may also reroute traffic over areas and paths where link quality requirements can be met. This enables guaranteed and predictable UAV operations and acceptable data links/channels for users. In addition, the mechanisms described herein enable officials to enforce/ensure that UAV operations have sufficient, regulated quality guarantees for command and control connectivity. For example, in one embodiment, the Flight Information Management System (FIMS) in the UTM can reroute, postpone, or cancel missions based on insufficient connectivity resources in the mission zone or regulate and enforce data connectivity provided/promised to the UAV by the wireless access networks.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
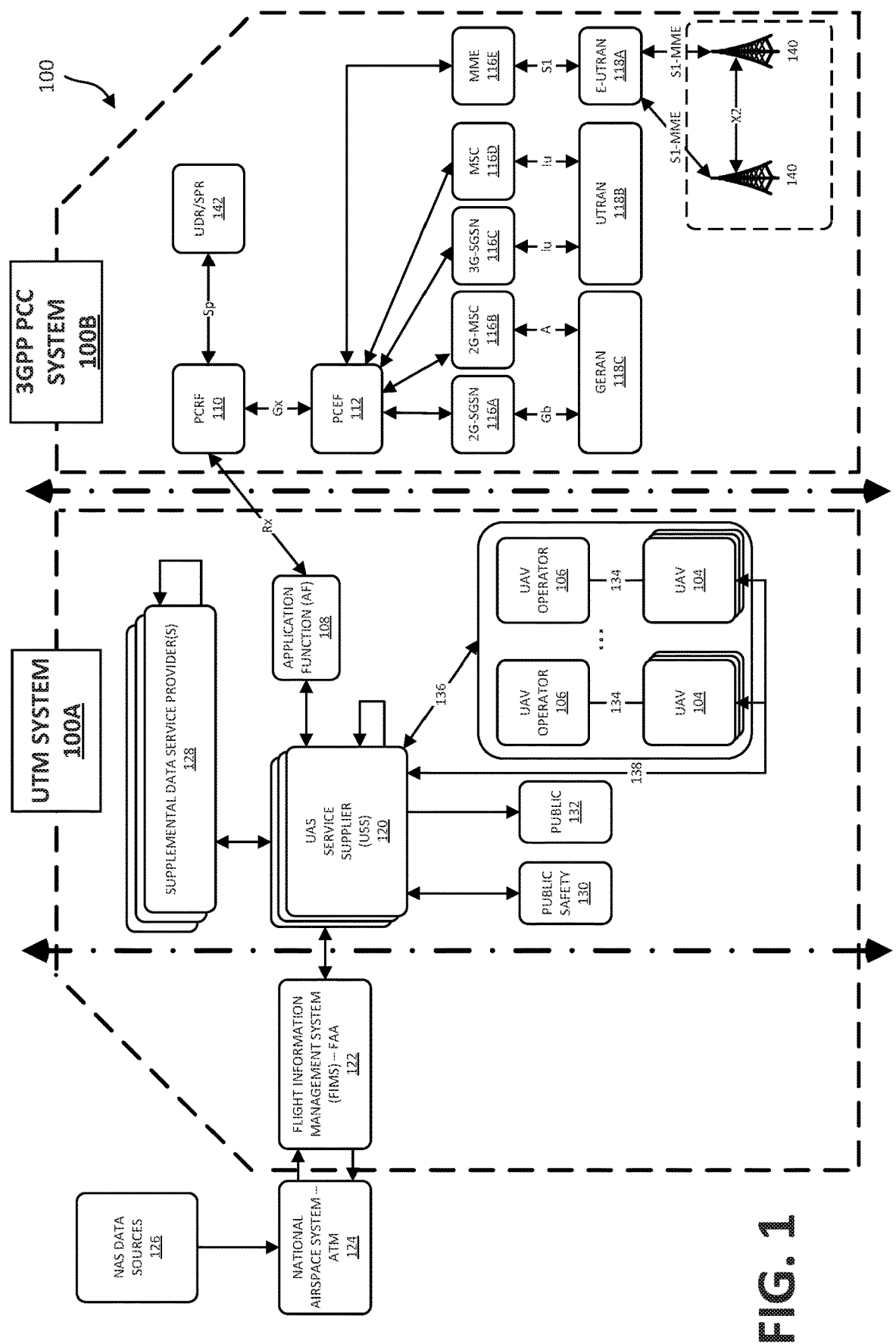
FIG. 1 illustrates an air traffic system, including an Unmanned Aerial Vehicle (UAV) Traffic Management (UTM) system and a 3rd Generation Partnership Project (3GPP) Policy and Charging Control (PCC) architecture/system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

As described herein, a new supplemental data service in an Unmanned Aerial Vehicle (UAV) Traffic Management (UTM) system/framework is proposed. This new supplemental data service can help UAVs and UAV operators plan data connectivity characteristics for a flight mission/plan. In one embodiment, this supplemental data service can receive connectivity requirements and use new functionality in a 3rd Generation Partnership Project (3GPP) Policy and Charging Control (PCC) system/architecture to verify and plan for optimal/preferred quality-of-service (QoS) settings/requirements throughout the flight path of the mission.

In real life scenarios, flight missions are undertaken for a specific purpose. For example, the purpose of a flight mission for a UAV may be the delivery of a package. In this scenario, to conserve battery power, a UAV may decide to operate an onboard camera for ten minutes at the beginning of the mission (e.g., from just before taking off until after successfully taking off) as well as at the end of the mission (e.g., the last ten minutes of the mission when the UAV is attempting to make a safe landing). The data connectivity/network requirements in this case are restricted to a limited geography centered around the take-off site/region/area and the destination/landing site/region/area. Thus, data connectivity/network requirements in this scenario are not as stringent throughout the entire flight path, but instead are focused on particular areas. Similarly, for a surveillance centric operation/mission, an onboard camera needs to be switched on only around the target area, where the UAV will hover and monitor the target area to provide the desired detailed video. In this case, the quality of the video stream determines the desired bit-rate and thus the acceptable QoS characteristics/requirements of the link/channel. A mission would be deemed a failure if the minimum QoS requirements centered around the area/geography of interest are not met.

Accordingly, in one embodiment, if the required QoS requirements cannot be met at certain points along the flight path (e.g., the network and/or network elements cannot meet the QoS network requirements), this deficiency may be indicated to the UAV operator such that the UAV operator can plan for this contingency beforehand. However, if it is determined that the QoS requirements can be met, the new functionality proposed herein enables a Flight Information Management System (FIMS) or other components of the UTM system to reserve resources from the 3GPP network and also enforce the reservations. These QoS requirements may correspond to telemetry, command and control (C2), and/or other data connections/links (e.g., still or video connections). In one embodiment, the functionality defined herein requires extensions to the Rx interface in the 3GPP PCC system and additional software logic to be added in the Policy and Charging Rules Function (PCRF) of the 3GPP PCC system.

FIG. 1 shows an air traffic system 100 for managing a flight of a UAV 104, according to one embodiment. The air traffic system 100 may be used for managing the flights of one or more UAVs 104 that are controlled/operated/piloted by corresponding UAV operators 106. The UAVs 104 may be interchangeably referred to as Unmanned Aircraft Systems (UASs) or drones throughout this description. The air traffic system 100 may be divided into two logical portions: an UAV Traffic Management (UTM) system 100A and a 3rd Generation Partnership Project (3GPP) Policy and Charging Control (PCC) system/architecture 100B. In this configuration, the UTM system 100A provides flight plan information to the 3GPP PCC system 100B such that the 3GPP PCC system 100B may reserve and/or enforce quality-of-service (QoS) requirements. By reserving and enforcing QoS requirements, which were designated prior to commencement of the flight mission, the air traffic system 100 provides a more robust flight mission planning architecture that provides assurance to UAV operators 106 during planning stages.

In some embodiments, the UAVs 104 may be small or miniature UAVs, which are unmanned aircraft that are small enough to be considered portable by an average man and typically operate/cruise at altitudes lower than larger aircraft. For example, a small UAV may be any unmanned aircraft that is fifty-five pounds or lighter and/or is designed to operate below 400 feet. Although the embodiments described herein may be applied to small UAVs, the systems and methods are not restricted to aircraft of these sizes or that are designed to operate at particular altitudes. Instead, the methods and systems described herein may be similarly applied to aircraft of any size or design and with or without an onboard pilot/operator. For example, in some embodiments, the methods and systems described herein may be used for UAVs 104 larger than fifty-five pounds and/or UAVs 104 that are designed to fly above 400 feet.

The UAVs 104 are aircraft without an onboard human controller. Instead, the UAVs 104 may be operated/piloted using various degrees of autonomy. For example, a UAV 104 may be operated by a human (e.g., the UAV operator 106) located on the ground or otherwise removed and independent of the location of the UAV 104. For example, a UAV operator 106 may be located on the ground and acts to directly control each movement of a UAV 104 or a group of UAVs 104 through a radio control interface (e.g., a command and control (C2) interface). In this embodiment, the UAV operator 106 may transmit commands via a radio interface to cause the UAV 104 to adjust/move particular flight instruments (e.g., flaps, blades, motors, etc.) for the purpose of following a flight plan or another set of objectives. In other scenarios, the UAV operator 106 may provide a flight plan to the UAV 104. In response to the flight plan, the UAV 104 may adjust/move particular flight instruments to fulfill objectives of the flight plan. In these embodiments, a human operator may monitor the progress of the flight plan and intervene as needed or as directed. In some embodiments, the UAV operator 106 may be viewed as a remote human controller, a remote digital controller, an onboard digital controller, or a combination of the preceding.

Figure 2:
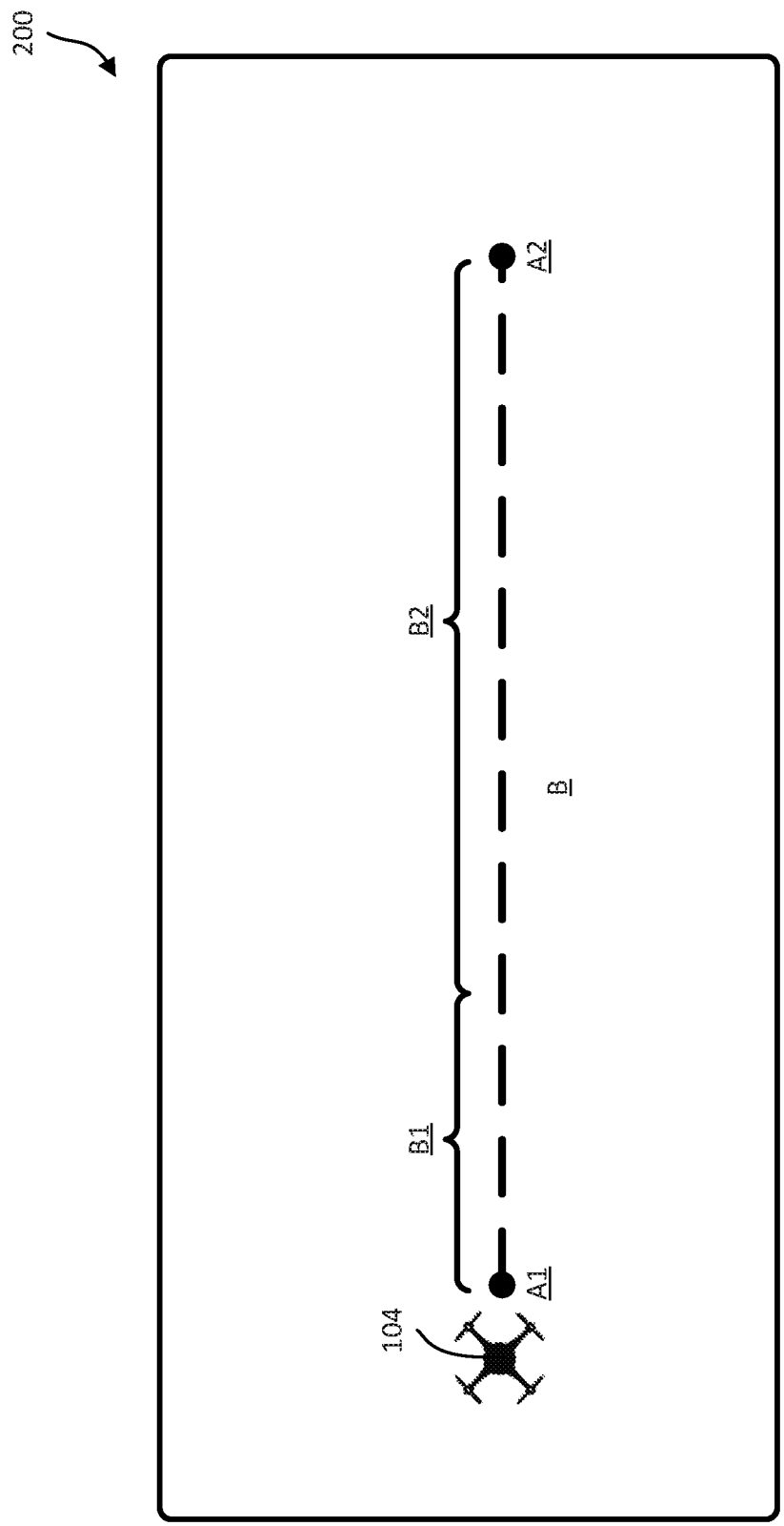
FIG. 2 illustrates an example flight plan with a set of coordinates according to one embodiment.

Throughout this description, a flight plan may be also referred to as a flight mission and may include one or more points of a path (e.g., a starting point, an ending point, and/or a set of waypoints, where each are defined by longitudinal and latitudinal coordinates), a set of velocities, a set of altitudes, a set of headings/directions, a set of events (e.g., capture video at prescribed times or locations, hover over an area for a specified interval, etc.), a time/expiration/duration, and a set of restricted zones/areas. For instance, the flight plan 200 shown in FIG. 2 includes the flight path B. The flight path B indicates that the UAV 104 is to take off from location A1 (corresponding to a first set of longitude and latitude coordinates) and travel to location A2 (corresponding to a second set of longitude and latitude coordinates) using the path B. The path B may be separated into the segments B1 and B2. In this scenario, the UAV 104 is restricted to an altitude between 300 feet and 400 feet and a velocity of 100 miles/hour during segment B1 and an altitude between 350 feet and 400 feet and a velocity of 90 miles/hour during segment B2. The above altitude and velocity limitations are merely exemplary and in other embodiments higher altitude and velocity limitations may be assigned/issued for a UAV 104 (e.g., altitude limitations above 400 feet and velocity limitations above 100 miles/hour).

Figure 3:
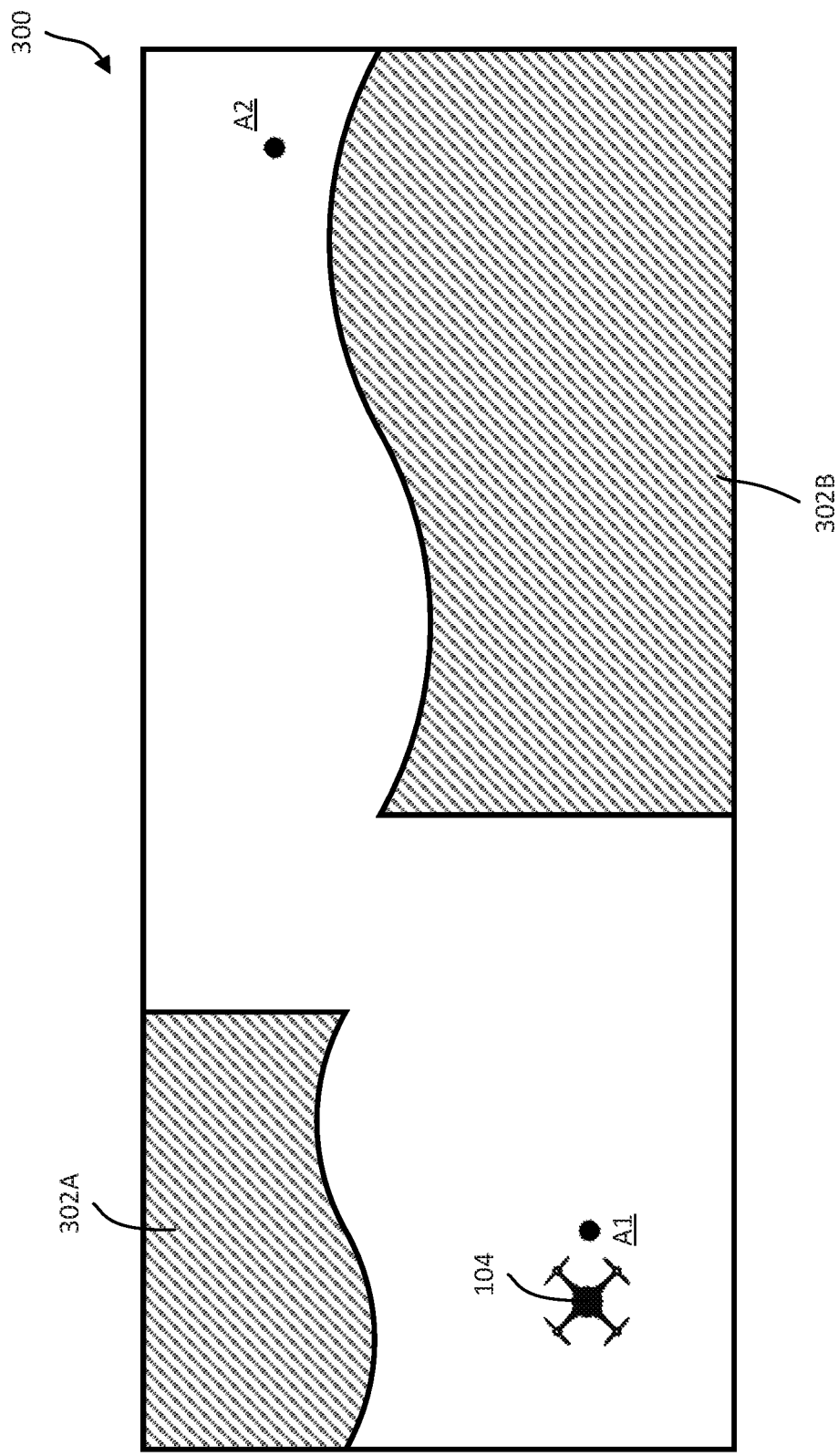
FIG. 3 illustrates an example flight plan with a set of restricted areas/zones according to one embodiment.

In another example, as shown in FIG. 3, a flight plan 300 may indicate that the UAV 104 is to take off from location A1, travel to location A2, and avoid a set of restricted zones 302A and 302B. In this example, the UAV 104 is directed to reach the target location A2 without entering the set of restricted zones 302A and 302B. The restricted zones may be relative to geographical location (defined by a set of coordinates), an altitude, and/or a velocity. For example, the UAV 104 may be permitted to enter restricted zone 302A but only at a prescribed altitude and/or only at a prescribed velocity.

Figure 4:
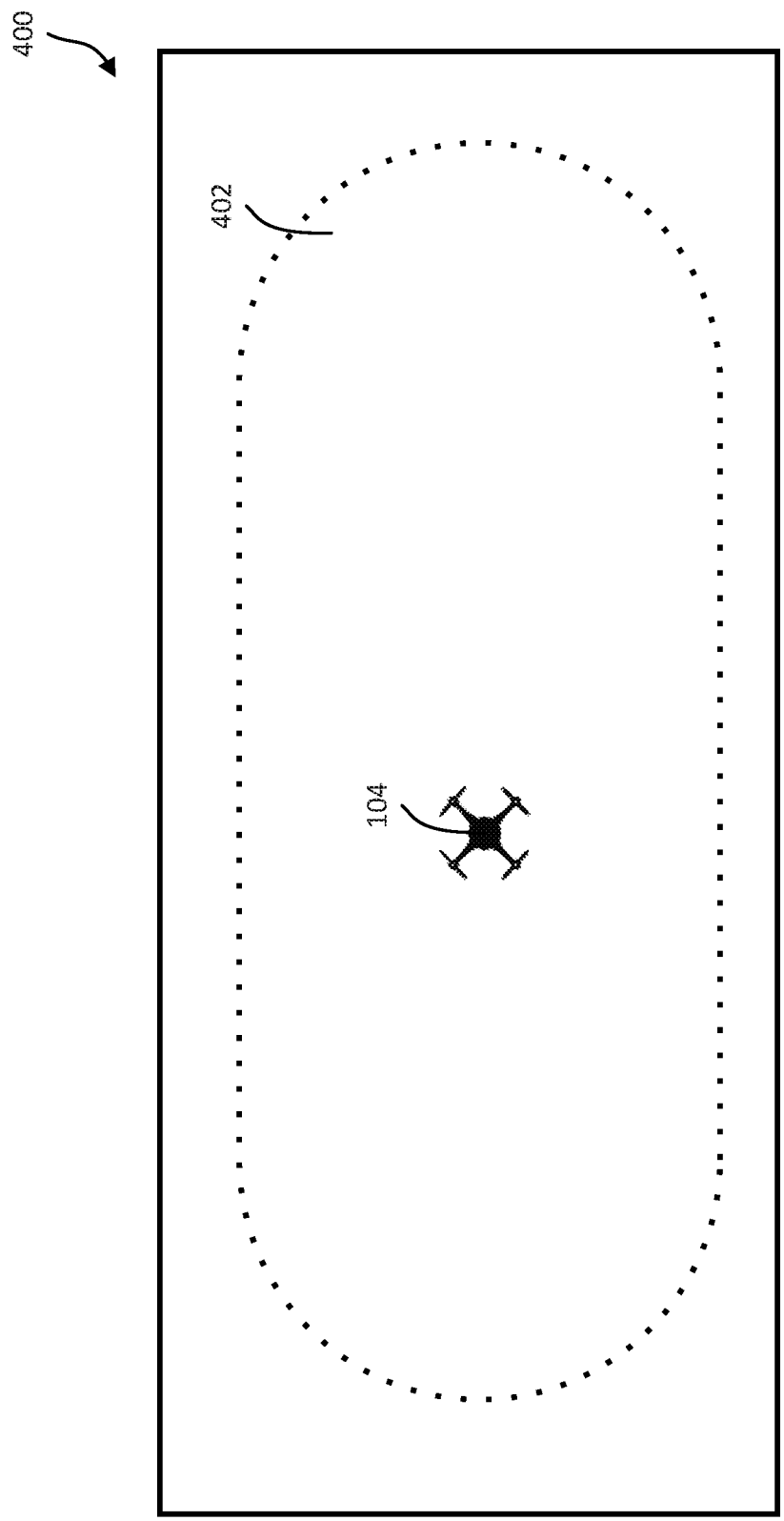
FIG. 4 illustrates an example flight plan with a designated clearance zone according to one embodiment.

In still another example, shown in FIG. 4, a flight plan 400 may provide clearance for the UAV 104 to fly in a designated clearance zone 402. The clearance zone 402 may be a confined area associated with an altitude range (e.g., between 400-500 feet) and/or an expiration/duration (e.g., an expiration of 11:40 PM). In this example, the UAV 104 may fly anywhere in the designated clearance zone 402 until the clearance has expired.

Although the flight plans described above are provided in relation to diagrams, flight plans may be encoded/presented using any format. For example, a flight plan may be represented and passed to the UAV 104 using an extensible markup language (XML) based format or another encoding or representation that is decodable and parseable by a machine.

Figure 5:
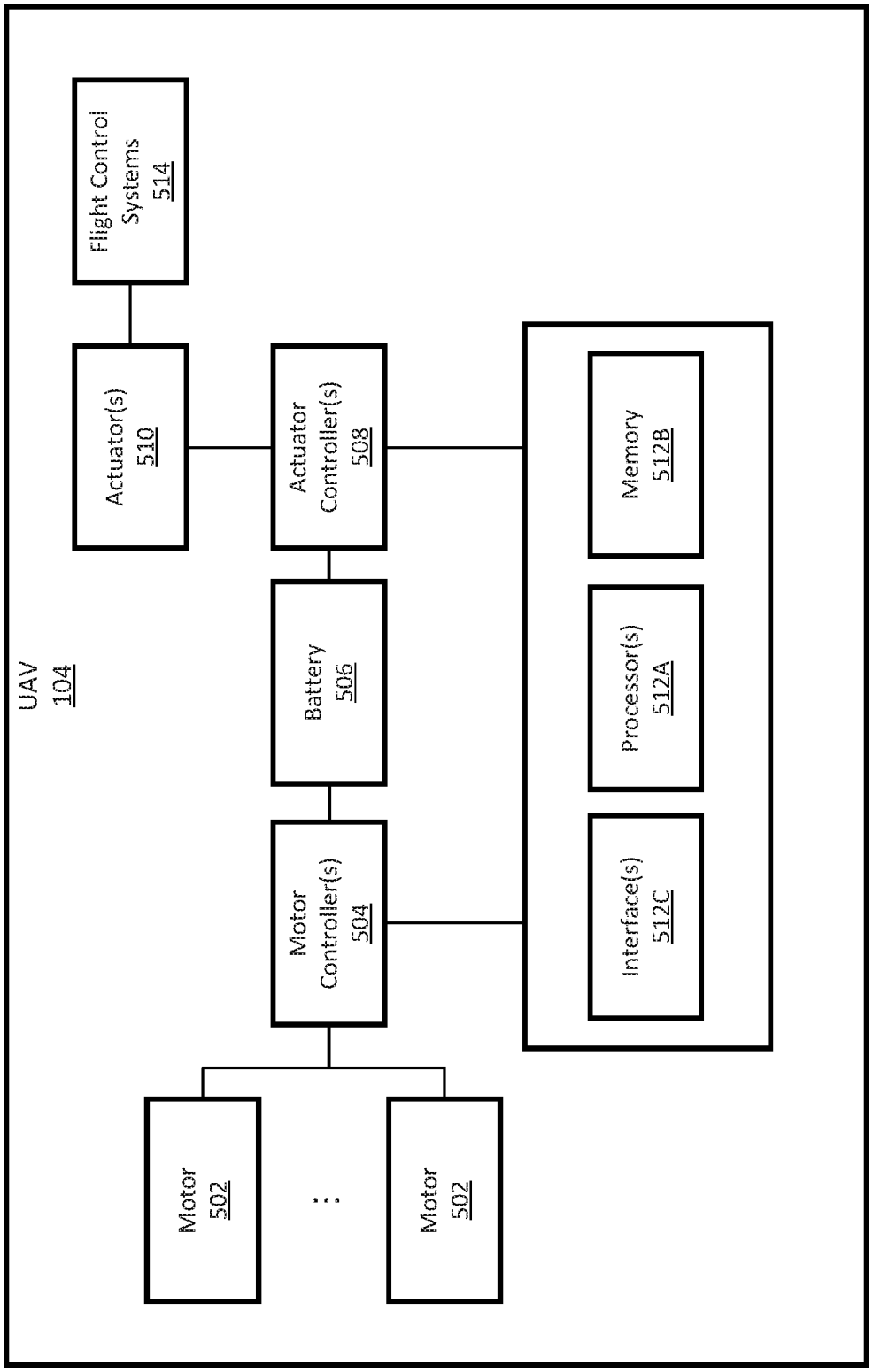
FIG. 5 illustrates a block diagram of a UAV according to one embodiment.

FIG. 5 shows a block diagram of a UAV 104 according to one example embodiment. Each element of the UAV 104 will be described by way of example below and it is understood that each UAV 104 may include more or less components than those shown and described herein.

As shown in FIG. 5, a UAV 104 may include a set of motors 502 controlled by one or more motor controllers 504, which control the speed of rotation of the motors (e.g., rounds per minute). As used herein, the term engine may be used synonymously with the term motor and shall designate a machine that converts one form of energy into mechanical energy. For example, the motors 502 may be electrical motors that convert electricity stored in the battery 506 into mechanical energy. The UAV 104 may include any number of motors 502 that are placed in any configuration relative to the body and/or an expected heading of the UAV 104. For example, the motors 502 may be configured such that the UAV 104 is a multirotor helicopter (e.g., a quadcopter). In other embodiments, the motors 502 may be configured such that the UAV 104 is a fixed wing aircraft (e.g., a single engine or dual engine airplane). In these embodiments, the motors 502, in conjunction with other elements of the UAV 104 serve to keep the UAV 104 in flight and/or propel the UAV 104 in a desired direction. In some embodiments, the UAV 104 may not include motors 502 for propelling the UAV 104 forward. In this embodiment, the UAV 104 may be a glider or lighter than air craft (e.g., a weather balloon).

As noted above, the motors 502 are controlled by one or more motor controllers 504, which govern the speed of rotation of each motor 502. In one embodiment, the motor controllers 504 may work in conjunction with actuator controllers 508 and actuators 510 that control the pitch/angle/rotation of propellers, flaps, slats, slots, rotors, rotor blades/wings, and other flight control systems 514. The motor controllers 504 and actuator controllers 508 may be managed/controlled by one or more processors 512A that are communicatively coupled to a memory 512B and one or more interfaces 512C.

In some embodiments, the memory 512B may store instructions that when executed by the processors 512A cause the UAV 104, via adjustments to settings/parameters of the motor controllers 504 and actuator controllers 508, to move in a particular direction (vertical or horizontal) or maintain a particular flight pattern (e.g., hover at a particular altitude).

The UAV 104 may communicate with one or more other devices using the one or more interfaces 512C. In one embodiment, one of the interfaces 512C in a UAV 104 may comply with a 3GPP protocol. For example, an interface 512C may adhere to one or more of Global System for Mobile communication (GSM) (including General Packet Radio Service (GPRS) and Enhanced Data Rates for GSM Evolution (EDGE)), UMTS (including High Speed Packet Access (HSPA)), and Long-Term Evolution (LTE). In some embodiments, one or more interfaces 512C in the UAV 104 may allow a UAV operator 106 and/or other parts of the UTM system 100A to control or provide plans/instructions to the UAV 104.

In one embodiment, the UAV 104 may operate in the Evolved Universal Mobile Telecommunications System (UMTS) Terrestrial Radio Access Network (E-UTRAN) 118A, the Universal Terrestrial Radio Access Network (UTRAN) 118B, and/or the GSM EDGE Radio Access Network (GERAN) 118C using one or more of the interfaces 512C. The E-UTRAN 118A, the UTRAN 118B, and/or the GERAN 118C may be administered by a network operator (e.g., a cellular network operator) and the UAV 104 may be a subscriber to one or more of these networks 118A, 118B, and 118C. The E-UTRAN 118A, the UTRAN 118B, and/or the GERAN 118C may comprise various network devices. Each of the network devices may, in some embodiments, be electronic devices that can be communicatively connected to other electronic devices on the network (e.g., other network devices, user equipment devices (such as the UAV 104), radio base stations, etc.). In certain embodiments, the network devices may include radio access features that provide wireless radio network access to other electronic devices such as user equipment devices (UEs) (for example a "radio access network device" may refer to such a network device). For example, the network devices may be base stations, such as an eNodeB in Long Term Evolution (LTE), a NodeB in Wideband Code Division Multiple Access (WCDMA), or other types of base stations, as well as a Radio Network Controller (RNC), a Base Station Controller (BSC), or other types of control nodes. Each of these network devices that include radio access features to provide wireless radio network access to other electronic devices may be referred to as cells, towers, cellular towers, or the like. In some embodiments, an interface 512C in a UAV 104 may assist in estimating a geographical location of the UAV 104 based on communications within the E-UTRAN 118A, the UTRAN 118B, and/or the GERAN 118C.

A UAV operator 106 may maintain a connection with a corresponding UAV 104 via connection 134. The connection 134 may be established through one or more interfaces 512C and may form a wireless command and control (C2) connection that allows the UAV operator 106 to control the UAV 104 through direct commands and/or through issuance of a flight plan. In some embodiments, the connection 134 may additionally allow the UAV operator 106 to receive data from the UAV 104. For example, the data may include images, video streams, telemetry data, and system status (e.g., battery level/status). In some embodiments, the connection 134 may be a point-to-point (e.g., mesh) connection while in other embodiments the connection 134 between the UAV operator 106 and the UAV 104 may be part of a distributed network. In one embodiment, the connection 134 is separate from the access networks E-UTRAN 118A, UTRAN 118B, and GERAN 118C while in other embodiments the connection 134 is part of one of the access networks E-UTRAN 118A, UTRAN 118B, and GERAN 118C.

In one embodiment, the UAV operator 106 may maintain a connection with other elements of the UTM system 100A. For example, the UAV operator 106 may maintain connection 136 with a UAV Service Supplier (USS) 120. In some embodiments, the connection 136 may be a point-to-point connection while in other embodiments the connection 136 may be part of a distributed network. In one embodiment, the connection 136 is separate from the access networks E-UTRAN 118A, UTRAN 118B, and GERAN 118C while in other embodiments the connection 136 is part of one of the access networks E-UTRAN 118A, UTRAN 118B, and GERAN 118C.

In one embodiment, the UAV 104 may maintain a connection with the USS 120. For example, the UAV 104 may maintain the connection 138 with USS 120. In some embodiments, the connection 138 may be a point-to-point connection while in other embodiments the connection 138 may be part of a distributed network. In one embodiment, the connection 138 is separate from the access networks E-UTRAN 118A, UTRAN 118B, and GERAN 1118C while in other embodiments the connection 138 is part of one of the access networks E-UTRAN 118A, UTRAN 118B, and GERAN 118C. In one embodiment, the connection 138 may allow the transmission of one or more pieces of data to the USS 120, including telemetry, authentication/authorization (e.g., using a subscriber identity/identification module (SIM) based identity to check UAV 104 registrations and authorizations), reports and logs (e.g., to establish liability in case of accidents), and commands to ensure compliance and safety (e.g., land immediately). The connection 138 may alternatively provide access to a data center to provide storage for the UAV 104 (e.g., storage of video streams or images captured by the UAV 104).

In one embodiment, the connection 136 allows the UAV operator 106 to transmit data to or receive data from the USS 120 regarding a current, past, or future flight. For instance, the connection 136 may allow the UAV operator 106 to convey to the USS 120 one or more of the following:

airspace information, alarms and notifications, authentication/authorization (e.g., use of a SIM based identity to check UAV 104 and pilot/UAV operator 106 registrations and authorizations), and reports and logs (e.g., to establish liability in case of accidents).

In some embodiments, the UAV operator 106 may transmit a proposed flight plan to the USS 120 via the connection 136. In one embodiment, the UTM system 100A may include a plurality of USSs 120. The set of USSs 120 may alternatively be referred to as a USS network. Each USS 120 offers support for safe airspace operations based on information received from a set of stakeholders and other information sources. The USSs 120 may share information about their supported operations to promote safety and to ensure that each USS 120 has a consistent view of all UAV 104 operations and thus enable the UAVs 104 to stay clear of each other.

As noted above, the USSs 120 may receive information from a variety of stakeholders and information sources such that the USSs 120 may determine whether a proposed flight plan is authorized to proceed. For example, the Federal Aviation Association (FAA) may provide directives and constraints to the USSs 120 via the Flight Information Management System (FIMS) 122. The FIMS 122 provides administration officials a way to issue constraints and directives to the UAV operators 106 and/or the UAV 104 via a USS 120. Such constraints and directives may be based on information received from the National Airspace System (NAS) Air Traffic Management (ATM) system 124 and/or other NAS data sources 126. In this example, the ATM system 124 could be used to mark certain restricted areas (e.g., airports and military bases) for the UAV 104 or restrict flights over forest fire areas or other spaces which are normally permitted for the UAV 104. In addition to the airspace state and other data provided by the ATM system 124 and other NAS data sources 126, the FIMS 122 may provide impact data, which may describe effects caused by the UAV 104 to a common airspace. Although described in relation to U.S. regulatory authorities, the systems and methods described herein may be similarly applied using any regulatory authority/agency overseeing any jurisdiction/territory/airspace.

In addition to constraints and directives received from the FIMS 122, the USSs 120 may receive data from supplemental data service providers 128. These supplemental data service providers 128 may provide various pieces of data that are used by the USSs 120 in planning and authorizing a flight plan, including terrain, weather, surveillance, and performance information. The supplemental data service providers 128 may communicate amongst each other to insure consistency and accuracy of information. In some embodiments, the supplemental data service providers 128 may provide data that is presented/transmitted to UAV operators 106 via the USS 120 for the planning of a flight plan/mission.

In some embodiments, as will be described in greater detail below, a QoS supplemental data service provider 128 may be used to reserve network resources in conjunction with the 3GPP PCC system 100B. In these embodiments, the QoS supplemental data service provider 128 can receive connectivity requirements from the UAV operator 106 and use new functionality in the 3GPP PCC system 100B to verify and plan optimal QoS settings/requirements throughout the flight path of the mission. If the required QoS requirements are not possible at certain points on the flight path, this issue may be indicated to the UAV operator 106 such that the UAV operator 106 may plan for this contingency prior to the UAV 104 taking flight. In some embodiments, the QoS supplemental data service provider 128 may work in conjunction with the FIMS to guarantee and reserve resources for the UAV 104 from a network in which the 3GPP PCC system 100B is operating. For example, the resources guaranteed and reserved for a C2 control interface/link of the UAV 104. If resources are unavailable, then the flight mission of the UAV 104 will be rerouted or postponed.

In some embodiments, the USSs 120 may receive constraints from public safety sources 130. This information may limit UAV 104 missions over areas when such flights may negatively affect public safety. For example, UAV 104 missions may be limited over areas that are currently hosting events with large crowds of people. In some embodiments, the public safety sources 130 may provide data that is presented/transmitted to UAV operators 106 via the USS 120 for the planning of a flight plan/mission. The USSs 120 may also make UAV 104 flight/operation information available to the public 132.

As noted above, the USS 120 may determine if a proposed flight plan is authorized in view of directives, constraints, and information received from various stakeholders/sources. After concluding that the proposed flight plan is authorized or not authorized to proceed, the USS 120 may transmit a response to the UAV operator 106. In response to receiving an authorized flight plan, the UAV operator 106 may begin controlling the UAV 104 to effectuate the authorized flight plan or the UAV operator 106 may transmit the authorized flight plan or some set of instructions describing the objectives of the authorized flight plan to the UAV 104. Based on inputs from the UAV operator 106, the processor 512A together with instructions stored in the memory 512B may control the motor controllers 504 and/or actuators 510 to achieve the objectives of the flight plan.

As shown, the UTM system 300A may include an 3GPP application function (AF) 108. The AF 108 can negotiate with the 3GPP PCC system 100B on behalf of the UAV operator 106 and the QoS supplemental data service providers 128 to reserve a set of network resources that will insure a set of QoS requirements/settings are maintained through various portions of the flight plan. The negotiation may be carried out over an Rx interface with a Policy and Charging Rules Function (PCRF) 110 of the 3GPP PCC system 100B. In one embodiment, the Rx interface may be made to carry out pre-emptive resource allocations for UAV 104 flight missions and to plan for optimal flight paths based on the projected resource utilization in the network of the 3GPP PCC system 100B. In addition to extension of the Rx interface, other components of the 3GPP PCC system 100B may be extended to support interfacing with the UTM system 100A.

Figure 6:
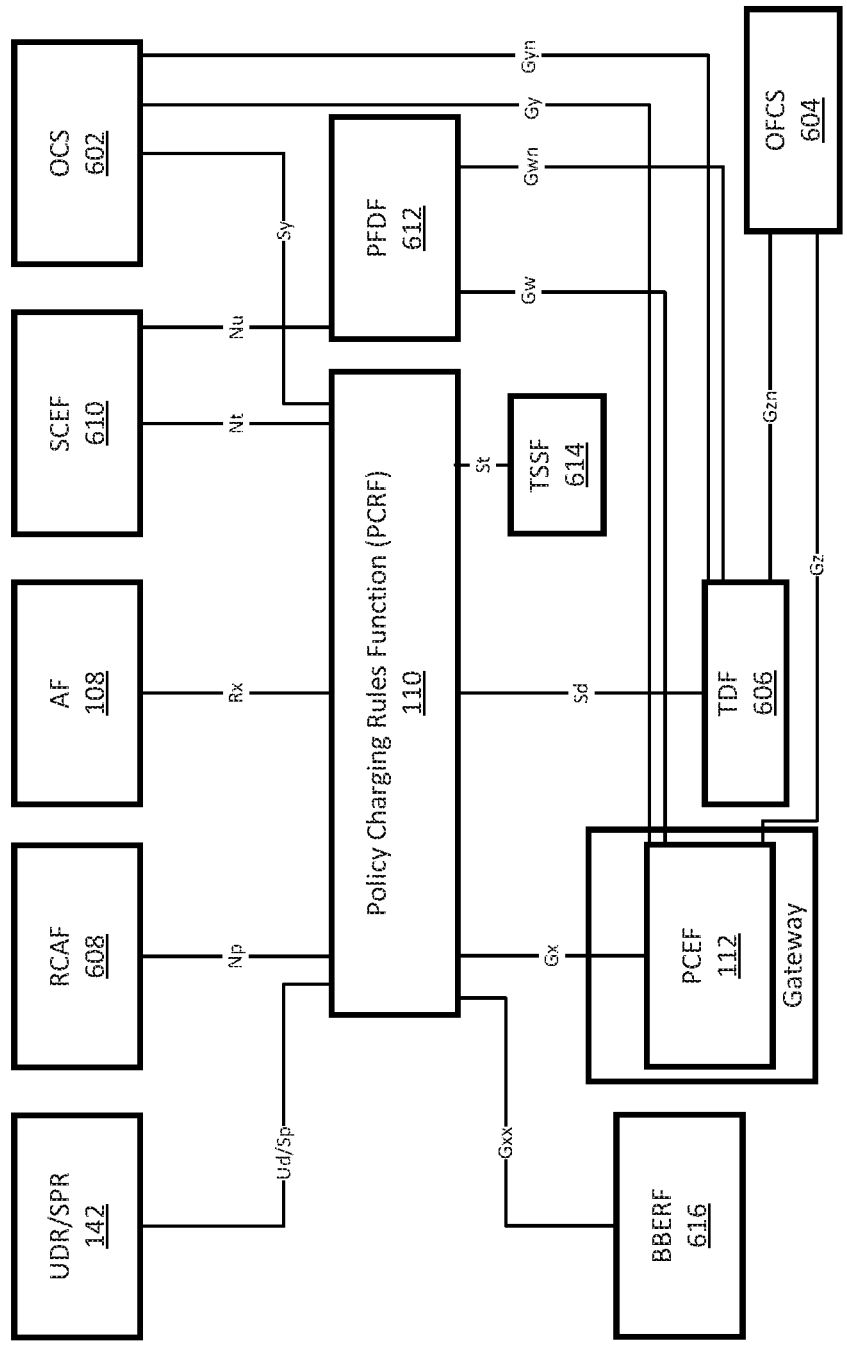
FIG. 6 shows an expanded view of the 3GPP PCC architecture/system according to one embodiment.

As noted above, the AF 108 may communicate with the PCRF 110 to allow the UTM system 100A and the 3GPP PCC system 100B to interoperate such that network resources may be reserved to meet QoS requirements of a UAV 104 flight plan. As shown in FIG. 6, the PCRF 110 may act as the central entity for the 3GPP PCC system 100B. In one embodiment, the PCRF 110 is the service function that is responsible for all QoS and the bearer configurations for all attached user equipment (UE) (e.g., the UAV 104). In some embodiments, the PCRF 110 may use Policy and Charging Enforcement Functions (PCEFs) 112 in different gateways to enforce that the allowed/reserved QoS and bearer configurations are applied. The PCRF 110 may reside on a Packet Data Network (PDN) Gateway node, through which all UE bearers are routed.

In some embodiments, as shown in FIG. 6, which shows an expanded view of the 3GPP PCC system 100B according to one embodiment, the 3GPP PCC system 100B provides and utilizes multiple interfaces for several support functions. For example, a User Data Repository (UDR)/Subscriber Profile Repository (SPR) 142 may be used to provide UE subscriber-subscription information to the PCRF 110 via the Ud/Sp interfaces; an Online Charging System (OCS) 602 and an Offline Charging System (OFCS) 604 may be used to collect subscriber charging related usage information via the Sy/Gy/Gyn and Gz/Gzn interfaces; a Traffic Detection Function (TDF) 606 may perform application detection and reporting to the PCRF 110 via the Sd interface; a Radio Access Network (RAN) Congestion Awareness Function (RCAF) 608 is a functional element which reports RAN User Plane Congestion Information (RUCI) via the Np interface to the PCRF 110 to enable the PCRF 110 to take the RAN user plane congestion status into account for policy decisions; a Service Capability Exposure Function (SCEF) 610 may be used to support security functions of the PCRF 110 via the Nt/Nu interfaces; a Packet Flow Description Function (PFDF) 612 may be used to report/provision Packet Flow Descriptions (PFDs) with the SCEF 610 and PCEFs 112 via the Nu/Gw/Gwn interfaces; a Traffic Steering Support Function (TSSF) 614 may be used for provisioning traffic steering control information from the PCRF 110 via the St interface; and a Bearer Binding and Event Reporting Function (BBERF) 616 may be used to assist with flow detection via the Gxx interface. Further, as mentioned above, the AF 108 and the Rx interface, which the PCRF 110 exposes, may provide dynamic policy and/or charging control over Internet Protocol-Connectivity Access Network (IP-CAN) user plane behavior for applications. In some embodiments, the AF 108, via the Rx interface, can change QoS requirements/settings and/or enable-disable certain IP-CAN sessions or UE connectivity.

In one embodiment, each PCEF 112 may be coupled to one or more controllers 116. For example, a PCEF 112 may be coupled to 2G Serving General Packet Radio Service (GPRS) Support Node (SGSN) 116A and/or a 2G Mobile services Switching Centre (MSC) 116B corresponding to a GSM EDGE Radio Access Network (GERAN) 118C. In this embodiment, the 2G-SGSN 116A may communicate with the GERAN 118C via the Gb interface and the 2G-MSC 116B may communicate with the GERAN 118C via the A interface. The 2G-SGSN 116A and the 2G-MSC 116B may assist in managing charging/billing, location request management, authorization of location services, and general operation of location services for the GERAN 118C.

In some embodiments, the PCEF 112 may be coupled to a 3G-SGSN 116C and/or an MSC server 116D corresponding to a Universal Terrestrial Radio Access Network (UTRAN) 118B. In this embodiment, the 3G-SGSN 116C and the MSC server 116D may communicate with the UTRAN 118B via the Iu interface. The 3G-SGSN 116C and the MSC server 116D may manage charging/billing, location request management, authorization of location services, and general operation of location services for the UTRAN 118B.

In some embodiments, the PCEF 112 may be coupled to a Mobility Management Entity (MME) 116E corresponding to an Evolved Universal Mobile Telecommunications System (UMTS) Terrestrial Radio Access Network (E-UTRAN) 118A. In this embodiment, the MME 116E may communicate with the E-UTRAN 118A via the S1 interface. The MME 116E may manage charging/billing, location request management, and general operation of location services for the E-U IRAN 118A.

Each of the access networks GERAN 118C, UTRAN 118B, and E-UTRAN 118A may be composed of various network elements that act as attachment points for UEs, including the UAVs 104. For example, the access networks GERAN 118C, UTRAN 118B, and E-UTRAN 118A may each include one or cells 140. In some embodiments, the cells 140 may be enhanced nodeBs (eNodeBs) and/or a radio base station (RBSs).

Figure 7:
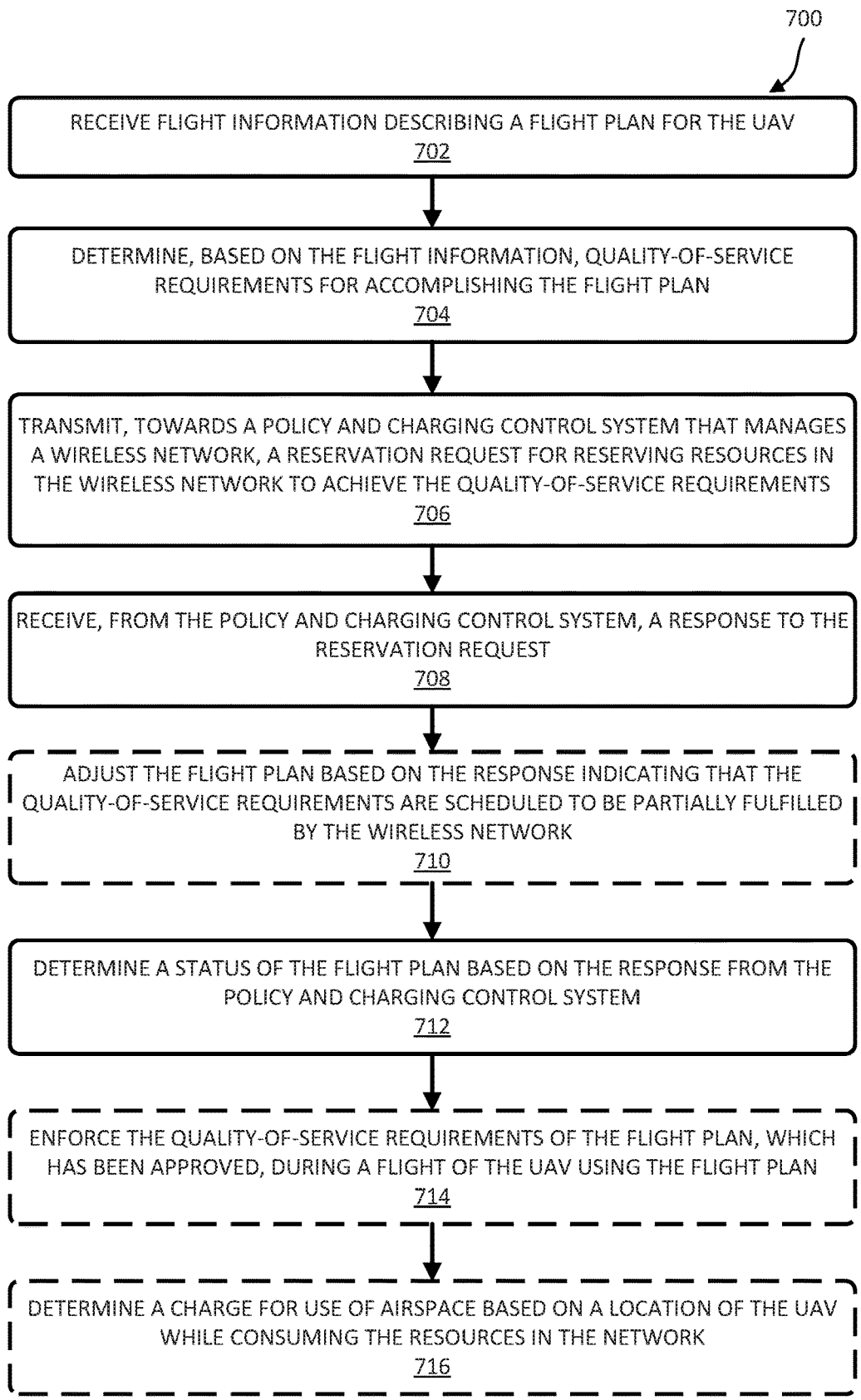
FIG. 7 shows a method for managing a UAV according to an embodiment.

Turning now to FIG. 7, a method 700 will be described for managing a UAV 104 according to an embodiment. The method 700 may be performed by one or more components of the air traffic system 100. For example, one or more of the operations of the method 700 may be performed by the PCRF 110, the PCEF 112, the AF 108, and/or the QoS supplemental data service provider 128. Although the operations of the method 700 are shown and described in a particular order, it is understood that the operations may be performed in a different order and in some embodiments, may be performed simultaneously or in partially overlapping time periods. As will be described in greater detail below, the method 700 enables the 3GPP PCC system 100B in conjunction with the UTM system 100A to estimate and reserve radio/network resources for a flight plan/mission of the UAV 104 in advance of the mission based on mission requirements. This functionality can be used to ensure sufficient control and UAV 104 connectivity throughout the mission.

As used herein, radio/network resources may be frequency band and/or time divisions associated with a network element (e.g., a cell 140). Availability of the radio/network resource may be defined as the frequency division being available for use during the specified time interval (e.g., the frequency division is not currently reserved for another UE during the time interval) and are capable of delivery connectivity to achieve the QoS requirements based on the anticipated location of the UAV 104.

The description of the method 700 will be described in relation to 3GPP network elements (e.g., the 3GPP PCC system 100B) and the UTM system 100A shown in FIG. 1. However, it is understood that in other embodiments, particularly those that do not employ a 3GPP network, different network and UTM elements may be utilized.

Figure 8:
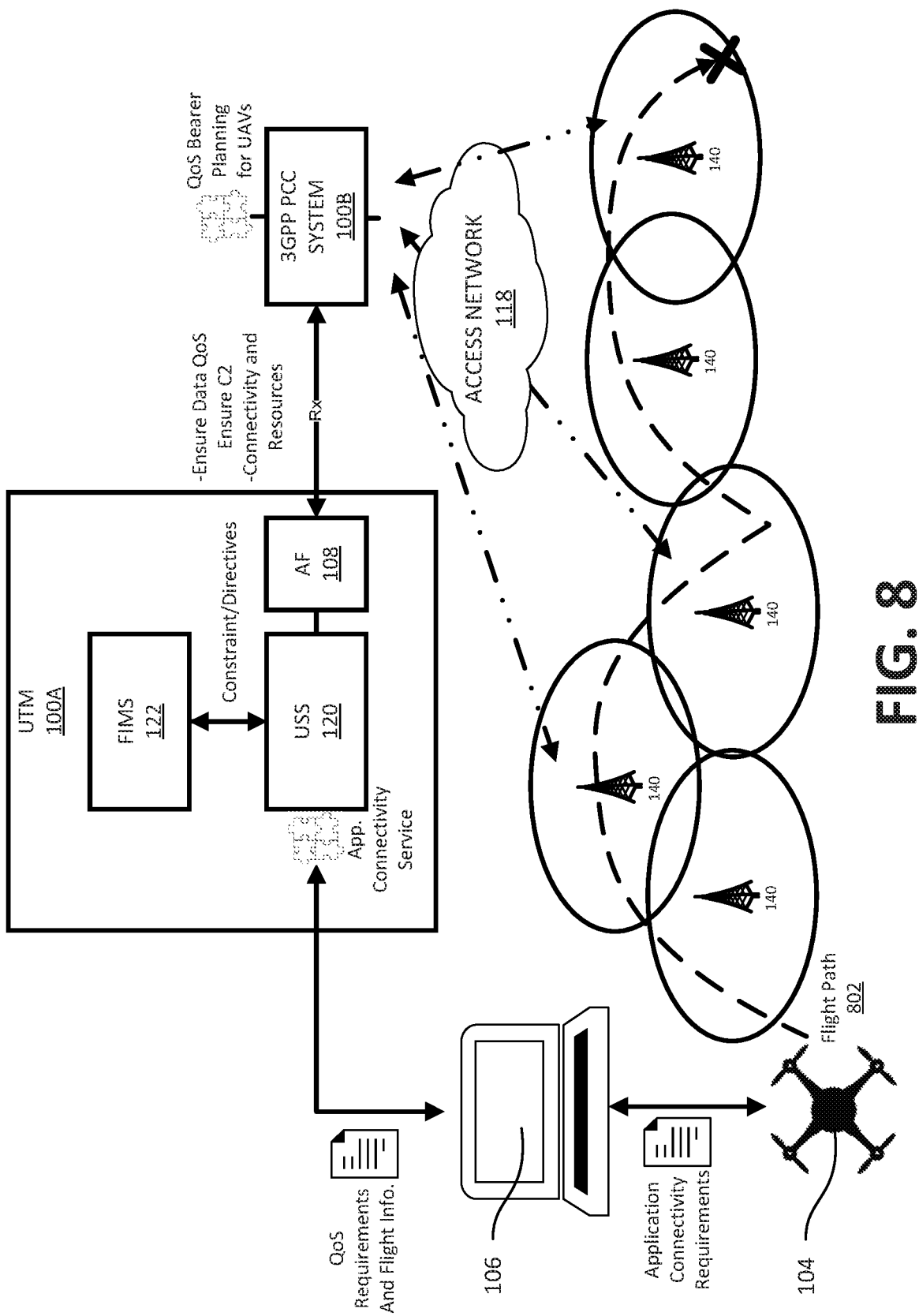
FIG. 8 shows a system architecture for a data quality-of-service (QoS) and command and control (C2) enforcement service provided by the UTM system and the 3GPP PCC system according to one embodiment.

In one embodiment, the method 700 may commence at operation 702 with receipt of flight information describing a flight plan for the UAV 104. In one embodiment, the flight information may be received by the UTM system 100A from a UAV 104 or a UAV operator 106. For example, as shown in FIG. 7, at operation 702, the UTM system 100A may receive flight information describing a flight plan for the UAV 104. In this example embodiment, the flight information may have been originally received from a UAV operator 106 via the USS 120. As shown in FIG. 8, the UAV operator 106 may plan for a UAV 104 flight mission that is intended to follow the flight path 802, which passes through areas covered by different cells 140 of a wireless access network 118. Accordingly, the UAV operator 106 will know the objective(s) of the flight mission and the application connectivity requirements needed to successfully carry out the mission.

Following receipt of the flight information, QoS requirements for accomplishing the flight plan may be determined at operation 704 based on the flight information. In some embodiments, the QoS requirements may include various pieces of information that define the network resources and/or thresholds necessary to properly/fully accomplish an objective of the flight mission. For example, the QoS requirements describe one or more of a QoS Class Identifier (QCI), a throughput threshold, a jitter threshold, a latency threshold, and an error threshold at particular points along a flight path. In some embodiments, the QoS requirements may include a general need for connectivity or coverage during particular points/portions of the flight path. For example, a mission may include streaming video of a target. In this example embodiment, the QoS requirements may include an indication that connectivity/coverage to an access network 118 is needed at a point along the flight path that is proximate to the target.

In an embodiment, the flight information includes one or more of an objective of the flight plan, a flight path, and an application to be used during the flight plan, where the QoS requirements are derived from the flight information by the QoS supplemental data service provider 128 and/or the USS 120. However, in some embodiments, the QoS requirements may be explicitly indicated by the UAV operator 106 in the flight information. For example, a UAV operator 106 can explicitly indicate that a C2 link for the UAV 104 is mapped to QCI "Mission Critical" 69, a video payload/link for the UAV 104 is mapped to QCI "Video" non-conversational/live/buffered 4/6/7/8 and a telemetry link for the UAV 104 is mapped to QCI "IMS Signaling" 5. In this embodiment, the QoS supplemental data service provider 128 and/or the USS 120 may determine the QoS requirements at operation 704 by parsing the flight information received from the UAV operator 106.

After determining QoS requirements, operation 706 may transmit, toward the 3GPP PCC system 100B that manages a wireless network 118, a reservation request for reserving resources in the wireless network 118 to achieve the QoS requirements. In one embodiment, the QoS supplemental data service provider 128 may translate the QoS requirements into the reservation request. In an embodiment, the reservation request may be delivered from the QoS supplemental data service provider 128 to the USS 120 such that the USS 120 may transmit the reservation request to a PCRF 110 of the 3GPP PCC system 100B. In one embodiment, the USS 120 may transmit the reservation request to the PCRF 110 via the AF 108. In this embodiment, the AF 108 may negotiate with the 3GPP PCC system 100B on behalf of the UAV operator 106 and the QoS supplemental data service provider 128. The negotiation may be carried out over the Rx interface, which may be extended to carry out this pre-emptive resource allocation for the UAV 104 flight mission and to plan for optimal flight paths based on the projected resource utilization in the wireless network 118. In addition to extending the Rx interface, the PCRF 110 and associated services/components may be extended to support this negotiation between the UTM system 100A and the 3GPP PCC system 100B.

Figure 9:
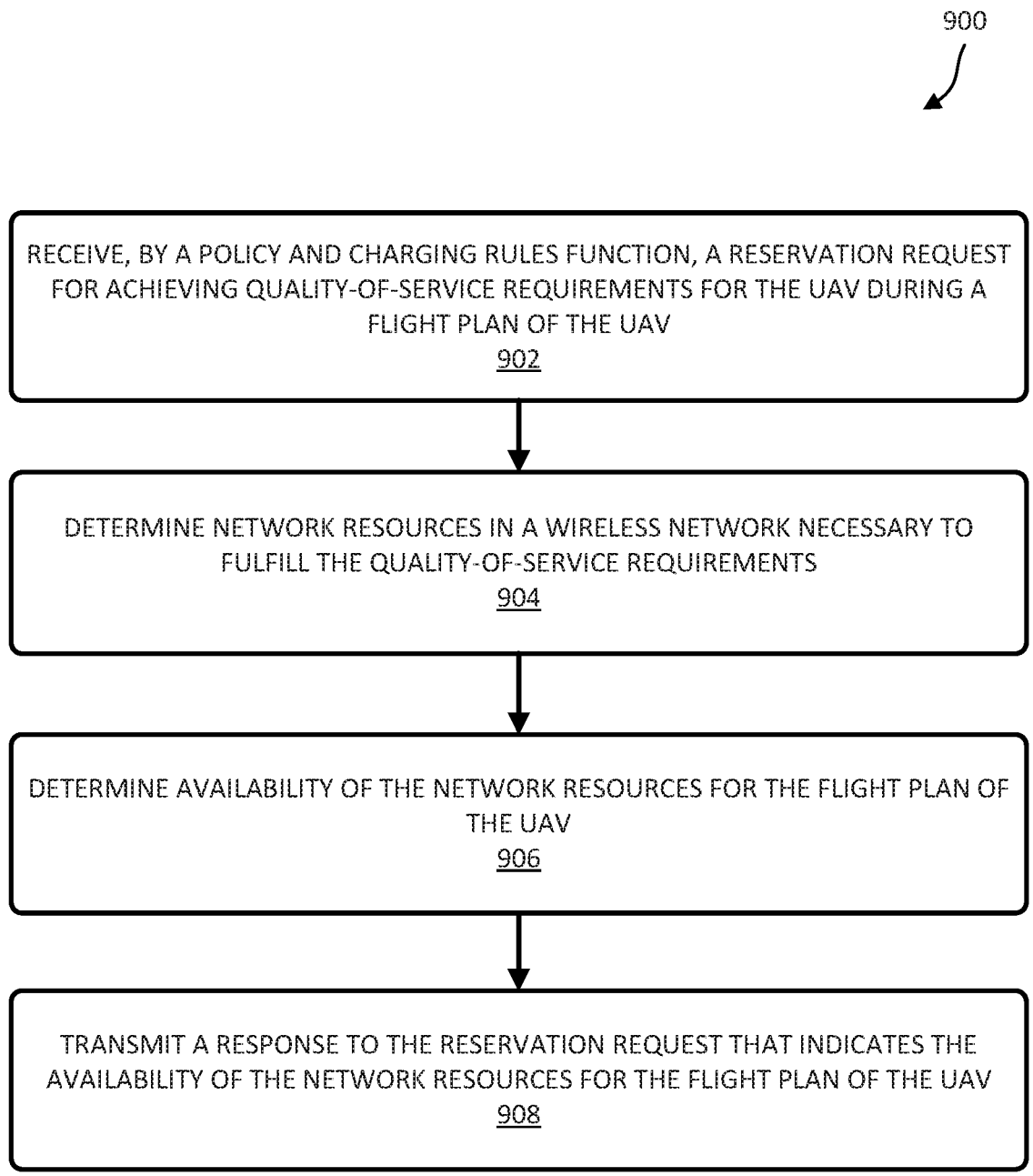
FIG. 9 shows a method or reserving network resources for a UAV according to one embodiment.

Turning now to FIG. 9, a method 900 for reserving network resources for the UAV 104 according to one embodiment, will be described. The method 900 may be performed in conjunction with the method 700. For example, the method 900 may operate between several operations of the method 700 (e.g., between the operation 706 and the operation 708). In some embodiments, the method 900 may be performed by various components of the 3GPP PCC system 100B. For example, the method 900 may be performed by one or more of the PCRF 110, one or more PCEFs 112, one or more controllers 116, and/or one or more cells 140.

The method 900 may commence at operation 902 with receipt, by the PCRF 110, of a reservation request. As noted above, the reservation request attempts to reserve network resources for achieving QoS requirements for the UAV 104 during a flight plan of the UAV 104. The reservation request received at operation 902 may include an indication of the QoS requirements and the flight plan, including a flight path of the UAV 104. In one embodiment, the reservation request is received by the PCRF 110 of the 3GPP PCC system 100B. As noted in relation to the method 700, the PCRF 110 may receive the reservation request from the AF 108 via the Rx interface, which may be extended to accommodate the reservation request and any associated responses. The remainder of the description of the method 900 will be described in relation to the PCRF 110 receiving the reservation request. However, it is understood that in other embodiments, particularly those that do not employ a 3GPP network, the reservation request may be received by another component of a network.

Following receipt of the reservation request, the PCRF 110 may determine at operation 904 network resources in the wireless network necessary to fulfill the QoS requirements. In one embodiment, the network resources may include one or more of PCEFs 112, controllers 116, and cells 140 and frequency and time divisions utilized/assignable by these elements. In one embodiment, operation 904 may include the PCRF 110 comparing a flight path of the UAV 104, which was received in the reservation request, with geographical locations of network resources. Based on the comparison, the PCRF 110 may determine network resources along the flight path that are necessary to provide wireless access to the UAV 104 during execution of the flight plan and will therefore be necessary to fulfill the QoS requirements for the flight plan.

In one embodiment, the PCRF 110 may consult the UDR/SPR 142 and the reservation request from the UTM system 100A and contact PCEFs 112 in different gateways that have cells 140 located along the flight path of the UAV 104. To know which PCEFs 112 and which cells 140 are needed for the planning, the PCRF 110 may utilize various positioning/location systems for determining proximity between cells 140 and positions along the flight path of the UAV 104. For example, Location Service (LCS) and/or the Global Positioning System (GPS) may be used at operation 904.

In some embodiments, the Gx interface between the PCRF 110 and the PCEF 112 may be extended to facilitate negotiations between the PCRF 110 and the PCEF 112. The intention of this negotiation is to request resource reservations for the flight plan of the UAV 104 in cells 140 of the access networks 118 based on estimated attachment points throughout the mission.

Following the determination of network resources, operation 906 may determine availability of these network resources for the flight plan of the UAV 104. In one embodiment, determining availability may include transmission of sub-requests from the PCRF 110 to the identified PCEFs 112. The sub-requests may attempt to reserve network resources provided or controlled by the PCEFs 112 through various other network elements associated with the PCEFs 112 (e.g., controllers 116 and cells 140). For example, the sub-requests may be processed by the PCEFs 112 and/or passed along to corresponding controllers 116 and/or cells 140. In one embodiment, the controllers 116 may receive the sub-requests and identify particular resources and times during which the resources are to be reserved. In response to the sub-requests, the controllers 116 may determine if the resources are available for reservation by the UAV 104 during the designated time frames. If the resources are available for reservation, the controller 116 may reserve as requested and transmit a sub-response indicating that the reservation was successful at operation 908. Conversely, if the resources are unavailable for reservation, the controller 116 may transmit a sub-response indicating that the reservation was unsuccessful.

The sub-responses may be forwarded to the PCRF 110 via the PCEFs 112. Based on the collective responses from the PCEFs 112, the PCRF 110 may generate and transmit a response to the reservation request that indicates the availability of the network resources for the flight plan of the UAV 104. For example, in one scenario, the response to the reservation request indicates that the QoS requirements are scheduled to be fulfilled by the wireless network 118 (e.g., all the sub-responses received from PCEFs 112 and/or controllers 116 indicate that corresponding sub-requests were completely fulfilled). In another scenario, the response to the reservation request indicates that the QoS requirements cannot be fulfilled by the wireless network 118 (e.g., the sub-responses received from PCEFs 112 and/or controllers 116 indicate that corresponding sub-requests cannot be fulfilled). In still another scenario, the response to the reservation request indicates that the QoS requirements are partially fulfilled by the wireless network 118 (e.g., one or more sub-response received from PCEFs 112 and/or controllers 116 indicate that a corresponding sub-request cannot be fulfilled while one or more sub-response received from PCEFs 112 and/or controllers 116 indicate that a corresponding sub-request can be fulfilled).

In an embodiment, the response includes alternative reservation plans when the QoS requirements cannot be met. These alternative reservation plans may include an alternative flight path that traverses cells 140 in a wireless network 118 that have resources to meet the originally requested QoS requirements.

Returning again to the method 700 shown in FIG. 7, after transmitting the reservation request, operation 708 may receive, from the 3GPP PCC system 100B, a response to the reservation request. In one embodiment, this response to the reservation request is the response transmitted by the method 900 and shown in FIG. 9. In one embodiment, the response to the reservation request may be received by the UTM system 100A from the 3GPP PCC system 100B. For example, the PCRF 110 may transmit the response to the AF 108, which in turn transmits the response to the USS 120 for further processing. In an embodiment, the response to the reservation request indicates that the QoS requirements are scheduled to be entirely/completely fulfilled by the wireless network 118. In another embodiment, the response to the reservation request indicates that the QoS requirements cannot be fulfilled by the wireless network 118. In still another embodiment, the response to the reservation request indicates that the QoS requirements are scheduled to be partially fulfilled by the wireless network 118.

As noted above in relation to the method 900 of FIG. 9, in an embodiment, the PCRF 110 generates the response based on one or more sub-requests sent to PCEFs 112 associated with network resources in the wireless network 118 and corresponding sub-responses to the sub-requests. The PCEFs 112 may be selected to receive sub-requests based on locations of network resources associated with the PCEFs 112 and relative to the flight plan such that the network resources associated with selected PCEFs 112 are proximate a flight path of the flight plan. The network resources may include one or more cells 140 (e.g., an enhanced nodeB and a radio base station). In an embodiment, the response includes alternative reservation plans when the QoS requirements cannot be met or can only be partially met. These alternative reservation plans may include an alternative flight path that traverses cells 140 in a wireless network 118 that have resources to meet the originally requested QoS requirements.

In an embodiment where the response to the reservation request indicates that the QoS requirements are scheduled to be partially fulfilled by the wireless network 118, at optional operation 710, the method 700 further includes adjusting the flight plan. In one embodiment, adjustment of the flight plan at operation 710 may be performed by one or more of the USS 120, a supplemental data service provider 128, and the UAV operator 106. Adjustment of the flight plan allows the UAV 104 to carry out a similar flight path to meet the objectives of the flight mission while still ensuring that the QoS requirements can be met. In one embodiment, this adjustment of the flight path at operation 710 may be performed based on information received from the 3GPP PCC system 100B via the response to the reservation request. For example, the response to the reservation request may include a recommendation from the 3GPP PCC system 100B regarding an alternative flight path and this alternative flight path may be utilized at operation 710 to adjust the flight plan.

At operation 712, the method 700 includes determining a status of the flight plan based on the response from the 3GPP PCC system 100B. As noted above, in an embodiment, the response to the reservation request indicates that the QoS requirements are scheduled to be fulfilled by the wireless network 118. The status of the flight plan may be determined to be approved when the response to the reservation request indicates that the QoS requirements are scheduled to be fulfilled. In an embodiment, the response to the reservation request indicates that the QoS requirements cannot be fulfilled by the wireless network 118. The status of the flight plan may be determined to be denied when the response to the reservation request indicates that the QoS requirements cannot be fulfilled or the flight plan may have been adjusted/modified at operation 710 such that the adjusted flight plan may be approved at operation 712. In an embodiment, the response to the reservation request indicates that the QoS requirements are scheduled to be partially fulfilled by the wireless network 118. In this embodiment, the flight plan may be denied/rejected or the flight plan may have been adjusted/modified at operation 710 such that the adjusted flight plan may be approved at operation 712. In one embodiment, operation 712 may be performed by the USS 120.

In some embodiments, at operation 714 QoS requirements may be enforced by a regulatory authority (e.g., the USS 120 may enforce QoS requirements of an approved flight plan). Enforcement of the QoS requirements may include monitoring the 3GPP PCC system 100B of the wireless network 118 to ensure the wireless network 118 delivers wireless connectivity to the UAV 104 to at least meet the QoS requirements. In some embodiments, enforcement at operation 714 may be performed by a system other than the USS 120 (e.g., the FIMS 122). However, in one embodiment, the USS 120 may assist the FIMS 122 in enforcing QoS requirements.

In some embodiments, at operation 716 a charge may be determined for use of airspace based on a location of the UAV 104 while consuming the resources in the wireless network 118. In one embodiment, the location of the UAV 104 is one of an expected location of the UAV 104 based on one of the flight information describing the flight plan and an actual location of the UAV 104. In some embodiments, the charge may be based on a set of rates established by an authority controlling the airspace and the rates may be relative to one or more of proximity to a landmark, time of day, and proximity to an event. In one embodiment, determination of a charge at operation 716 may be performed by one or more components of the 3GPP PCC system 100B (e.g., the PCRF 110).

The methods/systems described herein enable the UTM system 100A to provide a supplemental data service (e.g., the QoS supplemental data service provider 128) for the UAV 104 and the UAV operator 106 that can estimate and reserve data, telemetry, and control link/channel resources based on the requirements and mission/flight plan to be executed. In some embodiments, this supplemental data service may also reroute traffic over areas and paths where link quality requirements can be met (e.g., generation of an alternative flight path). This enables guaranteed and predictable UAV 104 operations and acceptable data links/channels for users. In addition, the mechanisms described herein enable officials to enforce/ensure that UAV 104 operations have sufficient and regulated quality guarantees for command and control connectivity.

Figure 10:
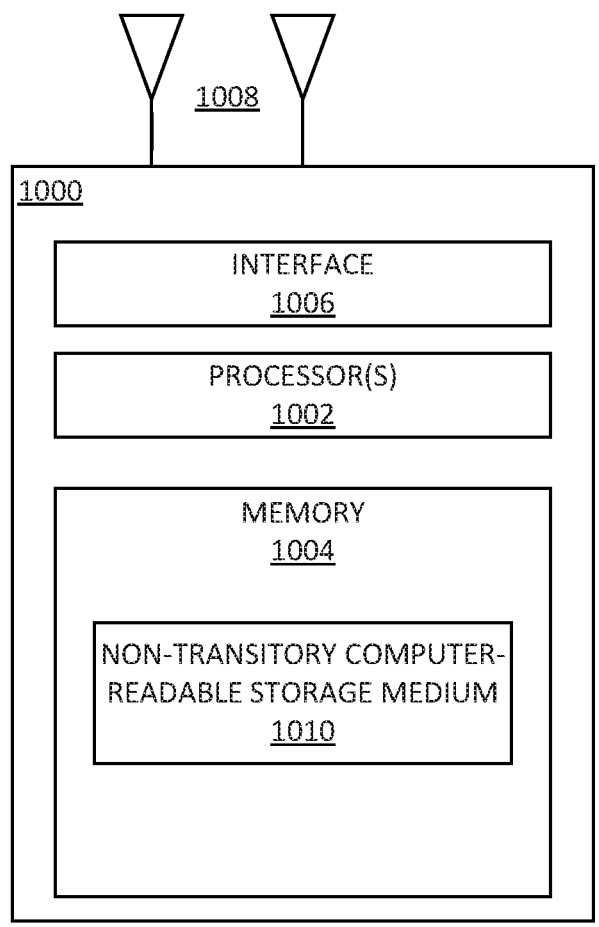
FIG. 10 illustrates a computing/networking device according to one embodiment.

Each element of the systems described herein may be composed of or otherwise implemented by a set of computing/networking devices. For example, FIG. 10 illustrates a computing/networking device 1000 according to one embodiment. As shown the computing/networking device 1000 may include a processor 1002 communicatively coupled to a memory 1004 and an interface 1006. The processor 1002 may be a microprocessor, controller, microcontroller, central processing unit, digital signal processor, application specific integrated circuit, field programmable gate array, any other type of electronic circuitry, or any combination of one or more of the preceding. The processor 1002 may comprise one or more processor cores. In particular embodiments, some or all of the functionality described herein as being provided by a component of the air traffic system may be implemented by one or more processors 1002 of one or more computing/networking devices 1000 executing software instructions, either alone or in conjunction with other computing/networking devices 1000 components, such as the memory 1004.

The memory 1004 may store code (which is composed of software instructions and which is sometimes referred to as computer program code or a computer program) and/or data using non-transitory machine-readable (e.g., computer-readable) media 1010, such as a non-transitory computer-readable storage medium (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory 1004 may comprise non-volatile memory containing code to be executed by the processor 1002. Where the memory 1004 is non-volatile, the code and/or data stored therein can persist even when the computing/networking device 1000 is turned off (when power is removed). In some instances, while the computing/networking device 1000 is turned on, that part of the code that is to be executed by the processor(s) 1002 may be copied from non-volatile memory into volatile memory (e.g., dynamic random access memory (DRAM), static random access memory (SRAM)) of the computing/networking device 1000.

The interface 1006 may be used in the wired and/or wireless communication of signaling and/or data to or from computing/networking device 1000. For example, interface 1006 may perform any formatting, coding, or translating to allow computing/networking device 1000 to send and receive data whether over a wired and/or a wireless connection. In some embodiments, the interface 1006 may comprise radio circuitry capable of receiving data from other devices in the network over a wireless connection and/or sending data out to other devices via a wireless connection. This radio circuitry may include transmitter(s), receiver(s), and/or transceiver(s) suitable for radio-frequency communication. The radio circuitry may convert digital data into a radio signal having the appropriate parameters (e.g., frequency, timing, channel, bandwidth, etc.). The radio signal may then be transmitted via the antennas 1008 to the appropriate recipient(s). In some embodiments, interface 1006 may comprise network interface controller(s) (NICs), also known as a network interface card, network adapter, local area network (LAN) adapter or physical network interface. The NIC(s) may facilitate in connecting the computing/networking device 1000 to other devices allowing them to communicate via wire through plugging in a cable to a physical port connected to a NIC. In particular embodiments, the processor 1002 may represent part of the interface 1006, and some or all of the functionality described as being provided by the interface 1006 may be provided in part or in whole by the processor 1002.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing an unmanned aerial vehicle (UAV), comprising:

receiving flight information describing a flight plan for the UAV;

determining, based on the flight information, quality-of-service requirements required along portions of a flight path for accomplishing the flight plan;

transmitting, toward a policy and charging control system that manages a wireless network, a reservation request for reserving network resources in the wireless network to achieve the quality-of-service requirements, wherein the network resources to be reserved include frequency division usage during a time interval for the UAV to communicate with the wireless network;

receiving, from the policy and charging control system, a response to the reservation request to reserve the network resources, wherein a policy and charging rules function of the policy and charging control system generates the response based on one or more sub-requests sent to policy and charging enforcement functions associated with network elements in the wireless network and corresponding sub-responses to the sub-requests, and wherein the policy and charging enforcement functions are selected to receive sub-requests based on locations of the network elements associated with the policy and charging enforcement functions and relative to the flight plan such that the network elements associated with selected policy and charging enforcement functions are proximate to the flight path of the flight plan;

determining a status of the flight plan based on the response from the policy and charging control system; and managing flight of the UAV utilizing the wireless network.

2. The method of claim 1, wherein the response to the reservation request indicates that the quality-of-service requirements are scheduled to be fulfilled by the wireless network, and, wherein the status of the flight plan is determined to be approved when the response to the reservation request indicates that the quality-of-service requirements are scheduled to be fulfilled.

3. The method of claim 2, further comprising:
enforcing the quality-of-service requirements of the flight plan, which has been approved, during a flight of the UAV using the flight plan,
wherein enforcement of the quality-of-service requirements includes monitoring the policy and charging control system of the wireless network to ensure the wireless network delivers wireless connectivity to the UAV to at least meet the quality-of-service requirements.

4. The method of claim 1, wherein the response to the reservation request indicates that the quality-of-service requirements cannot be fulfilled by the wireless network,
wherein the status of the flight plan is determined to be denied when the response to the reservation request indicates that the quality-of-service requirements cannot be fulfilled.

5. The method of claim 1, wherein the response to the reservation request indicates that the quality-of-service requirements are scheduled to be partially fulfilled by the wireless network, the method further comprising:
adjusting the flight plan based on the response indicating that the quality-of-service requirements are scheduled to be partially fulfilled by the wireless network.

6. The method of claim 1, wherein the flight information includes the quality-of-service requirements.

7. The method of claim 1, wherein the flight information includes one or more of an objective of the flight plan, a flight path, and an application to be used during the flight plan, wherein the quality-of-service requirements are derived from the flight information.

8. The method of claim 1, wherein a UAV Service Supplier (USS) transmits the reservation request.

9. The method of claim 1, wherein the network elements include one or more of an enhanced nodeB and a radio base station.

10. The method of claim 1, wherein the response includes alternative reservation plans when the quality-of-service requirements cannot be met.

11. The method of claim 1, wherein the wireless network is a 3rd Generation Partnership Project (3GPP) network.

12. The method of claim 1, further comprising:
determining a charge for use of an airspace based on a location of the UAV while consuming the network resources in the wireless network,
wherein the location of the UAV is one of an expected location of the UAV based on one of the flight information describing the flight plan and an actual location of the UAV.

13. The method of claim 12, wherein the charge is based on a set of rates established by an authority controlling the airspace, and wherein the rates are relative to one or more of proximity to a landmark, time of day, and proximity to an event.

14. A method for reserving resources for an unmanned aerial vehicle (UAV), comprising:
receiving, by a policy and charging rules function, a reservation request for achieving quality-of-service requirements for the UAV required along portions of a flight path for a flight plan of the UAV, wherein the reservation request includes a flight path of the UAV;
determining network resources in a wireless network to fulfill the quality-of-service requirements by comparing the flight path with locations of network elements in the wireless network to determine a set of network elements to fulfill the quality-of-service requirements, and wherein the network resources to be reserved include frequency division usage during a time interval for the UAV to communicate with the wireless network;
determining availability of the network resources to meet the quality-of service requirements for the flight plan of the UAV by:
transmitting sub-requests to the set of network elements to request reservation of the network resources provided by the set of network elements; and
receiving sub-responses to the sub-requests, wherein the sub-responses indicate abilities of the set of network elements to reserve the network resources indicated in the sub-requests;
transmitting a response to the reservation request that indicates the availability of the network resources for the flight plan of the UAV; and
utilizing the resources for use by the UAV to communicate with the wireless network.

15. A non-transitory computer-readable storage medium storing instructions which, when executed by a set of one or more processors of a computing device, cause the computing device to manage an unmanned aerial vehicle (UAV) by performing operations to:
receive flight information describing a flight plan for an unmanned aerial vehicle (UAV);
determine, based on the flight information, quality-of-service requirements required along portions of a flight path for accomplishing the flight plan;
transmit, toward a policy and charging control system that manages a wireless network, a reservation request for reserving network resources in the wireless network to achieve the quality-of-service requirements, wherein the network resources to be reserved include frequency division usage during a time interval for the UAV to communicate with the wireless network;
receive, from the policy and charging control system, a response to the reservation request to reserve the network resources, wherein a policy and charging rules function of the policy and charging control system to generate the response based on one or more sub-requests sent to policy and charging enforcement functions associated with network elements in the wireless network and corresponding sub-responses to the sub-requests, and wherein the policy and charging enforcement functions are selected to receive sub-requests based on locations of the network elements associated with the policy and charging enforcement functions and relative to the flight plan such that the network elements associated with selected policy and charging enforcement functions are proximate to the flight path of the flight plan;
determine a status of the flight plan based on the response from the policy and charging control system; and managing flight of the UAV utilizing the wireless network.

16. The non-transitory computer-readable storage medium of claim 15, wherein the response to the reservation request indicates that the quality-of-service requirements are scheduled to be fulfilled by the wireless network, and wherein the status of the flight plan is determined to be approved when the response to the reservation request indicates that the quality-of-service requirements are scheduled to be fulfilled.

* * * * *